(12) United States Patent
Kondoh et al.

(10) Patent No.: US 9,381,811 B2
(45) Date of Patent: Jul. 5, 2016

(54) VEHICLE DRIVING ASSIST SYSTEM

(75) Inventors: Takayuki Kondoh, Yokohama (JP);
Tomohiro Yamamura, Yokohama (JP);
Nobuyuki Kuge, Zushi (JP); Kenji Komori, Yashio (JP)

(73) Assignee: Nissan Motor Co., Ltd., Yokohama (JP)

( * ) Notice: Subject to any disclaimer, the term of this patent is extended or adjusted under 35 U.S.C. 154(b) by 2319 days.

(21) Appl. No.: 11/500,516

(22) Filed: Aug. 8, 2006

(65) Prior Publication Data
US 2007/0050110 A1   Mar. 1, 2007

(30) Foreign Application Priority Data

Aug. 24, 2005   (JP) .................................. 2005-242509

(51) Int. Cl.
G06F 17/00 (2006.01)
B60K 31/18 (2006.01)

(52) U.S. Cl.
CPC .......... B60K 31/18 (2013.01); B60W 2550/142 (2013.01)

(58) Field of Classification Search
CPC ................................. B60K 31/18; B60T 7/12
USPC ....................................................... 701/1, 36
See application file for complete search history.

(56) References Cited

U.S. PATENT DOCUMENTS

| | | | |
|---|---|---|---|
| 6,014,595 A | 1/2000 | Kobayashi | |
| 2001/0004029 A1 * | 6/2001 | Wakashiro et al. ........... | 180/170 |
| 2002/0005778 A1 | 1/2002 | Breed et al. | |
| 2002/0184236 A1 | 12/2002 | Donath et al. | |
| 2003/0023614 A1 | 1/2003 | Newstrom et al. | |
| 2003/0233187 A1 * | 12/2003 | Egami .............................. | 701/96 |
| 2003/0233902 A1 * | 12/2003 | Hijikata .......................... | 74/513 |
| 2003/0236608 A1 * | 12/2003 | Egami .............................. | 701/70 |
| 2004/0252020 A1 | 12/2004 | Matsumoto et al. | |
| 2004/0252027 A1 | 12/2004 | Torkkola et al. | |
| 2005/0165886 A1 * | 7/2005 | Tuer et al. ...................... | 709/203 |
| 2005/0258977 A1 * | 11/2005 | Kiefer et al. ................... | 340/903 |

FOREIGN PATENT DOCUMENTS

| | | |
|---|---|---|
| EP | 0640903 A1 | 3/1995 |
| JP | H11-208431 A | 8/1999 |

(Continued)

OTHER PUBLICATIONS

M. Lloyd, W. G. D., N. C. J., and A. C. Bittner. Brake pulsing as a haptic warning for an intersection collision avoidance (ica) countermeasure. Transportation Research Record, 1694:34-41, 1999.*

(Continued)

*Primary Examiner* — Thomas G Black
*Assistant Examiner* — Ce Li
(74) *Attorney, Agent, or Firm* — Global IP Counselors, LLP

(57) ABSTRACT

A vehicle driving assist system has a controller configured to urge a driver to slow down (decelerate) in locations where visibility is poor. The controller detects a traveling condition of a host vehicle, e.g., when the host vehicle is approaching a designated area, such as a school zone, and then selectively executes an imaginary speed limiting road protrusion control that generates an imaginary speed limiting road protrusion by artificially reproducing a vehicle behavior that simulates the host vehicle crosses an actual speed limiting road protrusion arranged on a road surface, based on the traveling condition of the host vehicle.

20 Claims, 26 Drawing Sheets

(56) References Cited

FOREIGN PATENT DOCUMENTS

| JP | 2001-301589 | 10/2001 |
| JP | 2001-301593 | 10/2001 |
| JP | 2002-250632 | 9/2002 |
| JP | 2004-067070 | 3/2004 |
| JP | 2004-352052 | 12/2004 |
| JP | 2005-018461 | 1/2005 |
| JP | 2005-170134 | 6/2005 |
| JP | 2005-173909 | 6/2005 |

OTHER PUBLICATIONS

Sara Beth Brown. Effects of Haptic and Auditory Warnings on Driver Intersection Behavior and Perception. Virginia Tech Transportation Institute. Apr. 8, 2005.*

* cited by examiner

| DESIGNATED AREA | CONTROL EXECUTION TIME FRAME |
|---|---|
| SCHOOL ZONE | 7:30 ~ 17:00 |
| RESIDENTIAL AREA | 6:00 ~ 21:00 |
| NURSING HOME FACILITY | 6:00 ~ 21:00 |
| DAY CARE FACILITY | 8:30 ~ 15:00 |

Fig. 10

(a) VEHICLE SPEED < PRESCRIBED SPEED  (b) VEHICLE SPEED ≥ PRESCRIBED SPEED

| CONTROL | APPROACHING DESIGNATED AREA CONTROL A | TRAVELING WITHIN DESIGNATED AREA CONTROL B | DEPARTING DESIGNATED AREA CONTROL C |
|---|---|---|---|
| EXECUTION CONDITIONS | DISTANCE TO DESIGNATED AREA WITHIN PRESCRIBED DISTANCE AND VEHICLE SPEED WITHIN PRESCRIBED RANGE | VEHICLE SPEED WITHIN PRESCRIBED RANGE | TIME TO DEPART DESIGNATED AREA AND VEHICLE SPEED WITHIN PRESCRIBED RANGE |
| VIRTUAL SPEED BUMP | GENERATE 3 TIMES | GENERATE CONTINUOUSLY | GENERATE 2 TIMES |
| VISUAL INFORMATION | SPEED DISPLAY | SPEED DISPLAY | SPEED DISPLAY |
| AUDIO INFORMATION | SINGLE-BURST ALARM SOUND (TWICE) | CONTINUOUS ALARM SOUND | SINGLE-BURST ALARM SOUND (ONCE) |

Fig. 15

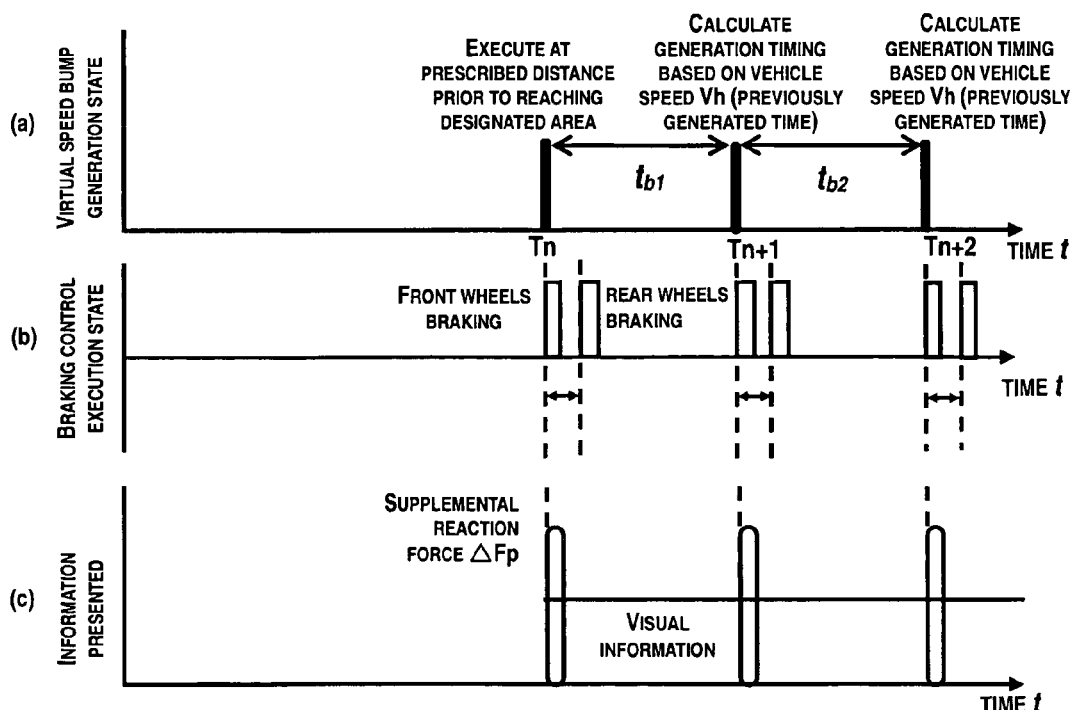

Fig. 16

VEHICLE DRIVING ASSIST SYSTEM

BACKGROUND OF THE INVENTION

1. Field of the Invention

The present invention generally relates to a vehicle driving assist system that assist a driver with respect to the operation of a vehicle. More specifically, the present invention relates a vehicle driving assist system that urges a driver to slow down (decelerate) in selected locations.

2. Background Information

Various vehicle driving assist systems has been proposed to assist a driver with respect to the operation of a vehicle. One example of a vehicle driving assist system is disclosed in Japanese Laid-Open Patent Publication No. 2005-018461 in which the system assists a driver approaching an intersection without a traffic light from a road that does not have the right of way with respect to the other road forming the intersection. This system assists the driver by displaying an image of the other road forming the intersection when the driver's vehicle is about to enter the intersection. This system displays the situation in both the left and right directions when the driver's vehicle is about to enter the intersection. The system enables the driver to check the situation in the left and right directions to avoid having a collision with another vehicle. Another example of a vehicle driving assist system is disclosed in Japanese Laid-Open Patent Publication No. 11-208431.

SUMMARY OF THE INVENTION

The vehicle driving assist system described in Japanese Laid-Open Patent Publication No. 2005-018461 informs the driver of the road situation in the left and right directions by presenting visual information on a display. Since the driver must take the trouble to look at the display device in order to check the road situation, this system is not able to aggressively urge deceleration of the host vehicle.

According to one aspect of the present invention, a vehicle driving assist system is provided that basically comprises a traveling situation detecting section and an imaginary speed limiting road protrusion generating section. The traveling situation detecting section is configured to detect a traveling condition of a host vehicle. The imaginary speed limiting road protrusion generating section is configured to selectively generate an imaginary speed limiting road protrusion by artificially reproducing a vehicle behavior in the host vehicle that simulates the host vehicle crossing an actual speed limiting road protrusion arranged on a road surface, based on the traveling condition being detected.

BRIEF DESCRIPTION OF THE DRAWINGS

Referring now to the attached drawings which form a part of this original disclosure:

FIG. 10 is an execution time chart that shows the execution time periods for virtual speed bump control in different types of designated area;

FIG. 15 summarizes the control operations that are executed during the specialized area approach control A, the specialized area control B, and the specialized area departure control C;

FIG. 16 is a series of graphs showing how the operating state of the imaginary speed limiting road protrusion (e.g., imaginary speed bump) control, the operating state of the braking control, and the information presented to the driver change over time;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
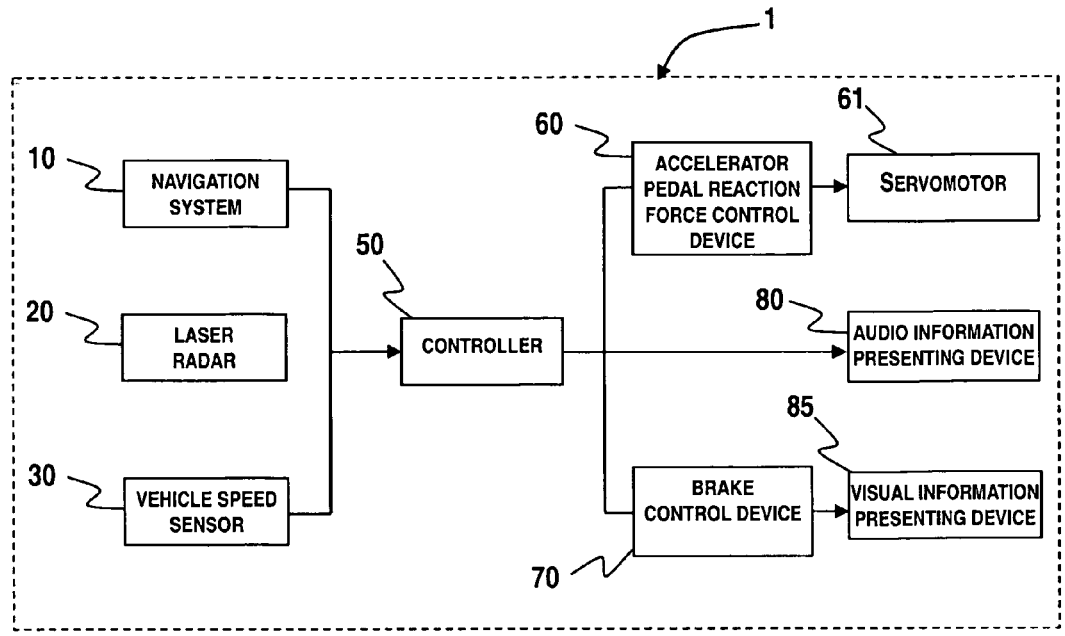
FIG. 1 is a block diagram of an on-board vehicle driving assist system in accordance with a first embodiment of the present invention.
Figure 2:
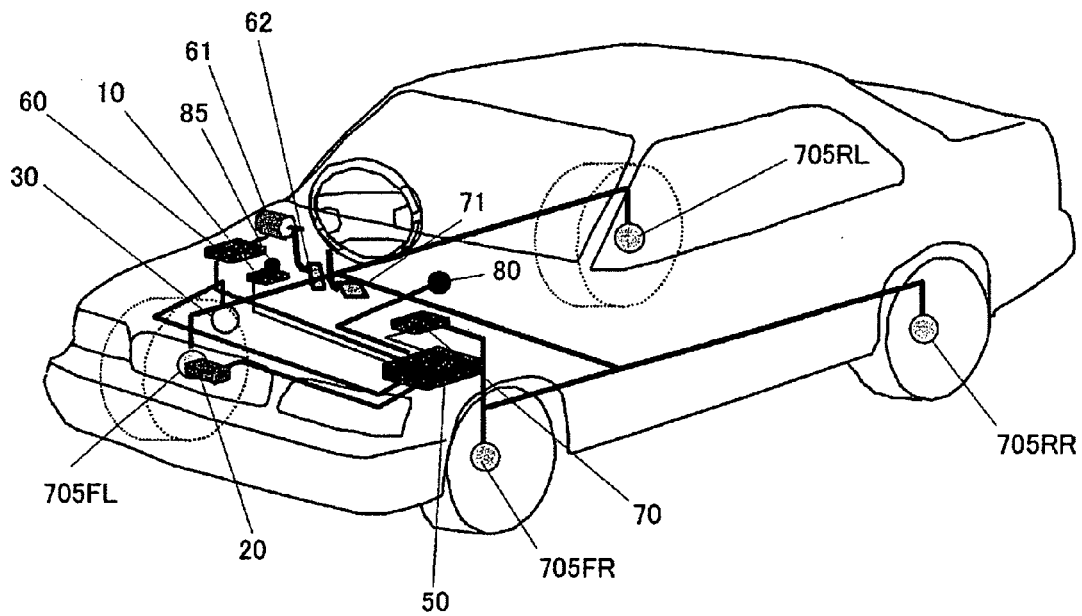
FIG. 2 is a schematic view of a host vehicle in which the vehicle driving assist system shown in FIG. 1 is installed in accordance with the first embodiment of the present invention.

Referring initially to FIG. 1, an on-board vehicle driving assist system is illustrated in accordance with a first embodiment of the present invention. FIG. 1 is a block diagram of a vehicle driving assist system in accordance with the first embodiment of the present invention. FIG. 2 is a schematic perspective view of a vehicle (hereinafter also called "the host vehicle") in which the vehicle driving assist system shown in FIG. 1 is installed in accordance with the first embodiment of the present invention. With the present invention, as explained below, the vehicle driving assist system conveys a risk potential of a vicinity of surrounding the host vehicle to the driver by manipulating the actuation reaction force that is exerted by a driver-operated driving operation device of the host vehicle when the driving operation device is operated. Additionally, deceleration can be more aggressively urged in an effective manner when deceleration of the host vehicle is necessary by artificially reproducing a behavior in the host vehicle that simulates the host vehicle crosses a speed bump. The term "speed bump" as used herein refers to a road protrusion that is intended to slow down a vehicle such as "speed bumps", "speed humps", and "rumble strips". Thus, the term "speed bump" should be interpreted as including speed limiting road protrusions that are intended to slow down a vehicle including but not limited to "speed bumps", "speed humps", and "rumble strips".

First, the main structures and features of the vehicle driving assist system will now be explained. As seen in FIGS. 1 and 2, the host vehicle is preferably includes, among other things, a navigation system 10, a laser radar 20, a host vehicle speed sensor 30, a controller 50, an accelerator pedal reaction force control device 60, a servomotor 61, an accelerator pedal 62, a brake control device 70, an audio information presenting device or section 80 and a visual information presenting device or section 85. The host vehicle has a right front wheel FR, a left front wheel FL, a right rear wheel RR and a left rear wheel RL to which braking forces are applied to simulate the host vehicle crossing a speed limiting road protrusion as discussed below.

The navigation system 10 is equipped with a GPS receiver and a map database. The navigation system 10 computes the current position of the host vehicle and road information regarding the road on which the host vehicle is traveling. The information obtained by the navigation system 10 is outputted to the controller 50. The laser radar 20 is mounted to a front grill portion, a bumper portion, or the like of the host vehicle and serves to horizontally scan a region in front of the host vehicle with an infrared light pulse. The laser radar 20 then measures the reflected light resulting from the infrared light reflecting off of a plurality of reflecting objects located in front of the host vehicle (normally, the rear ends of preceding vehicles). By measuring the time required for the reflected light to arrive, the laser radar 20 detects the following distance and existence direction to a plurality of preceding vehicles. The detected following distances and existence directions are sent to the controller 50. The region in front of the host vehicle scanned by the laser radar 20 is, for example, ±6 degrees with respect to the front of the host vehicle and the system detects preceding objects existing within this angular range.

The host vehicle speed sensor 30 detects the speed of the host vehicle. The host vehicle speed sensor 30 outputs a signal indicative of the speed of the host vehicle to the controller 50. For example, the host vehicle speed sensor 30 is configured and arranged to measure the rotational speed of the wheels and the rotational speed of the output side of the transmission, and then output the detected vehicle speed to the controller 50.

The controller 50 comprises a CPU and a ROM, a RAM, and other components peripheral to the CPU and serves to control the entire vehicle driving assist system 1. Based on the following distance information received from the laser radar 20 and the speed of the host vehicle received from the host vehicle speed sensor 30, the controller 50 recognizes the obstacle situation in the vicinity of the host vehicle, e.g., recognizes the traveling situation with respect to the obstacles in terms of relative distances and relative velocities with respect to the obstacles. Based on the preceding obstacle situation, the controller 50 calculates risk potentials indicating the degree of convergence between the host vehicle and each preceding obstacle. Then, based on the risk potentials with respect to the objects, the controller 50 executes the controls described below.

Figure 8:
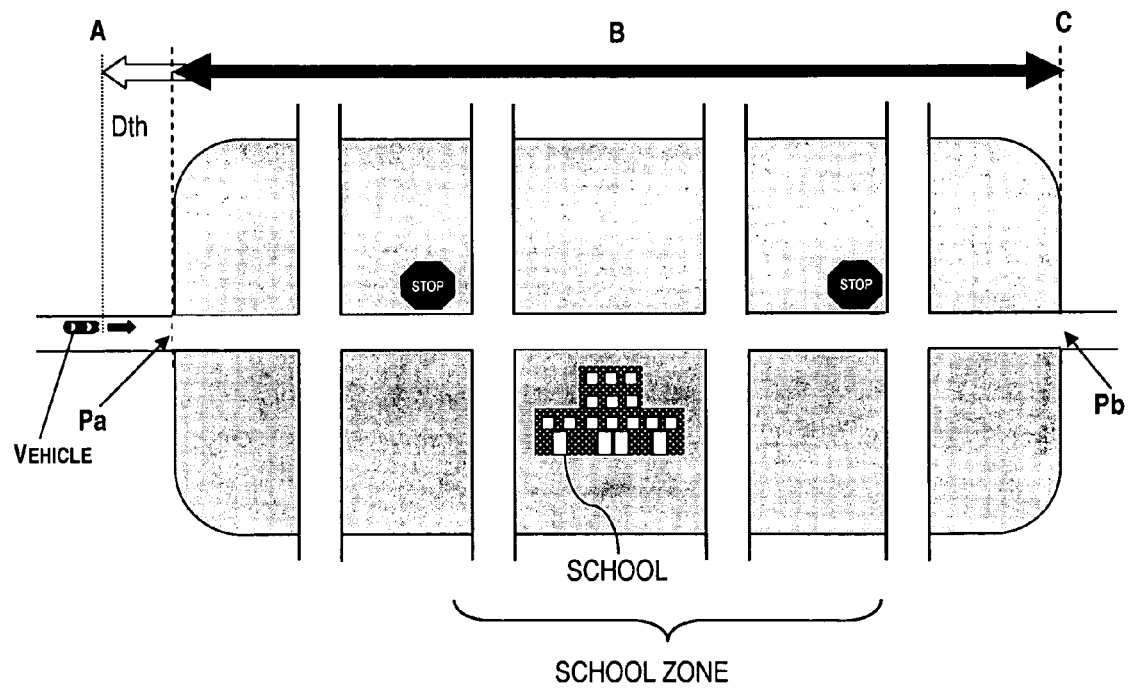
FIG. 8 is a diagrammatic illustration of a school zone and the approaching designated area control A, the traveling within designated area control B, and the departing designated area control C executed with respect to a school zone.

Based on the road information acquired from the navigation system 10, the controller 50 determines if the host vehicle is in an area where it is necessary to reduce the speed of the host vehicle (decelerate), e.g., if the host vehicle is nearing a school zone as seen in FIG. 8. If the host vehicle is in an area (hereinafter called a "designated area") where it is necessary to decelerate, then the controller 50 causes the host vehicle to decelerate in such a fashion that the driver experiences the sensation of traveling over an imaginary speed limiting road protrusions that are intended to slow down a vehicle including but not limited to imaginary speed bumps, imaginary speed humps, and imaginary rumble strips.

Figure 3:
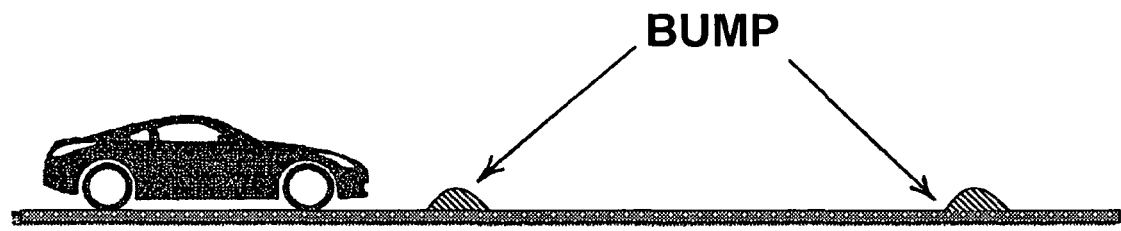
FIG. 3 is a diagrammatic illustration of the host vehicle approaching a pair of speed bumps installed on a road.

A speed limiting road protrusion is either an upwardly oriented protrusion or a downwardly oriented recess that is provided on a road surface for the purpose of urging a driver to decelerate a vehicle. An example of the general shape of a speed bump (one type of speed limiting road protrusion) is shown in FIG. 3. The vehicle driving assist system 1 controls a braking force of the host vehicle in such a fashion as to cause the host vehicle to undergo the kind of impact it would experience if it crossed over a speed bump on a road, thereby urging the driver to execute a deceleration operation of his or her own. Hereinafter, a control executed in order to generate the impact of an imaginary speed limiting road protrusion against the host vehicle is called a "virtual speed bump control" or a "virtual speed limiting road protrusion control".

In order to accomplish the aforementioned reaction force control, the controller 50 calculates a vehicle longitudinal reaction force control amount based on the risk potentials with respect to the obstacles in front of the host vehicle and outputs the calculated longitudinal reaction force control amount to the accelerator pedal reaction force control device 60. Also, when the host vehicle is traveling near or inside a designated area, the controller outputs a command to the brake control device 70 in order to execute virtual speed bump control. The controller 50 also sends signals for informing the driver of the operating state (execution state) of the virtual speed bump control to the audio information presenting device 80 and the visual information presenting device 85.

Based on the reaction force control amount from the controller 50, the accelerator pedal reaction force control device 60 also controls the torque generated by a servomotor 61 built into a linkage mechanism of the accelerator pedal 62. The servomotor 61 controls the reaction force generated based on a command value from the accelerator pedal reaction force control device 60 and can freely control the actuation reaction force (accelerator pedal depression force) generated when the driver operates the accelerator pedal 62.

Figure 4:
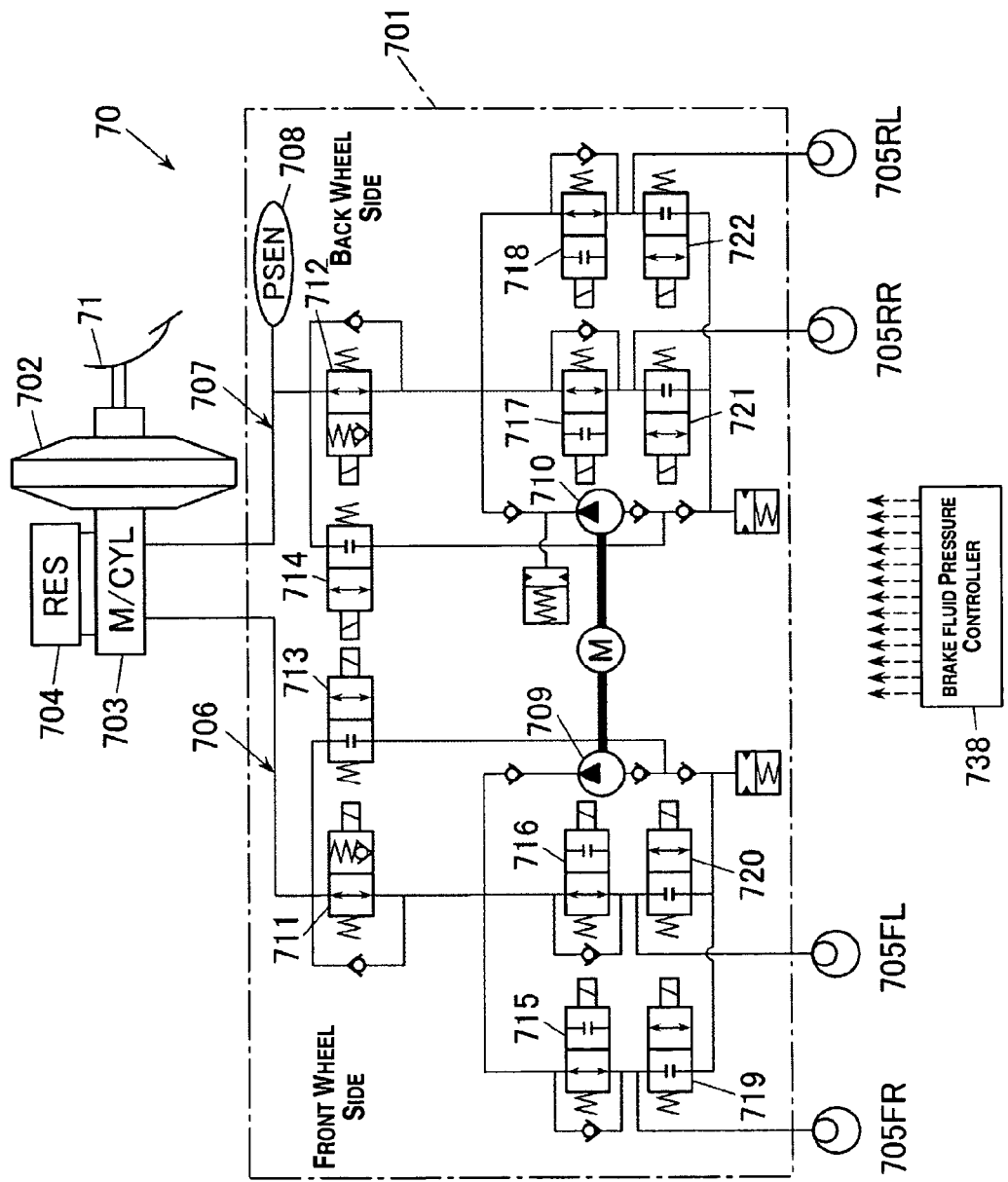
FIG. 4 is schematic view of the brake control device for the host vehicle in which the vehicle driving assist system is installed in accordance with the first embodiment of the present invention.

The brake control device 70 controls the brake fluid pressure to generate a braking force corresponding to the actuation state of the brake pedal 71 and to change the brake fluid pressure in response to a command from an external source. FIG. 4 is a schematic view of the brake control device 70. As shown in FIG. 4, the brake control device 70 includes a hydraulic (fluid) pressure controlling device 701, a hydraulic pressure booster 702, a master cylinder 703, a brake fluid (hydraulic fluid) reservoir 704, four wheel cylinders 705FR, 705FL, 705RR, and 705RL, a front wheel brake fluid pressure supply pipe 706, a rear wheel brake fluid pressure supply pipe 707, a brake fluid pressure sensor 708, a pair of pumps 709 and 710, a pair of gate valves 711 and 712, a pair of intake valves 713 and 714, a plurality of pressure increasing valves 715 to 718, a plurality of pressure decreasing valves 719 to 722 and a brake fluid pressure controller 738. The hydraulic (fluid) pressure controlling device 701 supplies brake fluid pressure to wheel cylinders 705FR, 705FL, 705RR, and 705RL that are installed on the right front wheel FR, the left front wheel FL, the right rear wheel RR, and the left rear wheel RL. The brake fluid pressure controller 738 controls the braking forces of the wheels FR, FL, RR, and RL.

When the driver depresses the brake pedal 71, the hydraulic pressure booster 702 causes the brake pedal depression force to increase and brake fluid pressure develops in the master cylinder 703. The brake fluid pressure generated in the master cylinder 703 is supplied to the front wheel cylinders 705FR and 705FL through a front wheel brake fluid pressure supply pipe 706 and to the rear wheel cylinders 705RR and 705RL through the rear wheel brake fluid pressure supply pipe 707. This transfer of brake fluid pressure operates the brakes.

When virtual speed bump control is executed, the brake fluid pressure controller 738 excites the solenoids of the gate valves 711 and 712 and the intake valves 713 and 714. As a result, the supply of hydraulic fluid from the master cylinder 703 is shut off by the gate valves 711 and 712 and communication between the reservoir 704 and the pumps 709 and 710 becomes possible. As shown in FIG. 4, when the pumps 709 and 710 are driven by the brake fluid pressure controller 738 with the pressure increasing valves 715 to 718 open and the pressure decreasing valves 719 to 722 closed, brake fluid pressure is supplied to the front and rear (left and right) wheel cylinders 705FR, 705FL, 705RR, and 705RL. As result, a braking force corresponding to a command from the brake fluid pressure controller 738 is generated.

By exciting or de-exciting the solenoid of each of the pressure increasing valves 715 to 718 and the pressure decreasing valves 719 to 722 based on a signal from the controller 50, the brake fluid pressure controller 738 can freely control the braking forces generated by the front and rear (left and right) wheel cylinders 705FR, 705FL, 705RR, and 705RL. Thus, the brake fluid pressure controller 738 can freely control the braking forces to decelerate the host vehicle as necessary to artificially reproduce a behavior in the host vehicle that simulates the host vehicle crossing a speed bump.

The audio information presenting device 80 includes a speaker that delivers a warning sound or an alarm in single bursts or in a continuous fashion in response to a command from the controller 50. The visual information presenting device 85 includes, for example, a liquid crystal display monitor installed in the instrument panel. The visual information presenting device 85 is configured to create an image in response to a command from the controller 50 and display the image on the display monitor. It is possible for the display monitor to also serve as the display monitor of the navigation system 10.

Figure 5:
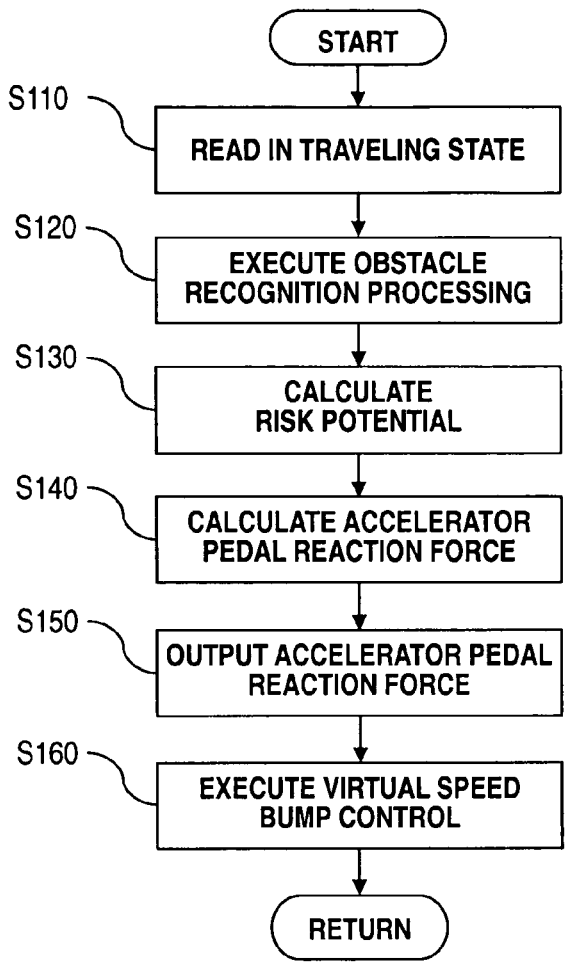
FIG. 5 is a flowchart showing the processing steps of a driving assistance control program in accordance with the first embodiment of the present invention.

The operation of a vehicle driving assist system 1 in accordance with the first embodiment will now be explained with reference to FIG. 5. FIG. 5 is a flowchart showing the processing steps of the driving assistance control executed by the controller 50 in the first embodiment of the present invention. This control loop is executed continuously once per prescribed time period, e.g., every 50 msec.

In step S110, the controller 50 reads in the traveling situation. The traveling situation mentioned here constitutes information related to the traveling circumstances of the host vehicle, including information regarding obstacles in front of the host vehicle. Thus, the controller 50 reads in the following distance D and existence direction to the obstacle detected by the laser radar 20 and the host vehicle traveling speed Vh of the host vehicle detected by the host vehicle speed sensor 30.

In step S120, the controller 50 recognizes the situation regarding obstacles in front of the host vehicle based on the traveling situation data read in step S110. More specifically, the controller 50 recognizes the current relative position, the movement direction, and the movement velocity of an obstacle(s) with respect to the host vehicle based on the current traveling situation data obtained in step S110 and based on the relative position, the movement direction, and the movement velocity of the obstacle with respect to the host vehicle that were detected during or prior to the previous control cycle and stored in the memory of the controller 50. The controller 50 then recognizes the manner in which the obstacle is disposed in front of the host vehicle and the manner in which the obstacle is moving relative to the host movement of the host vehicle.

In step S130, the controller 50 calculates a risk potential RP indicating the degree of convergence between the host vehicle and the obstacle in front of the host vehicle. The term "risk potential" refers to the degree of risk or possibility of danger. In this embodiment, the risk potential is contrived to increase as the host vehicle and an obstacle existing in the vicinity of the host vehicle draw closer together. Thus, the risk potential is a physical quantity that expresses how close the host vehicle and the obstacle are to each other, i.e., the degree to which the host vehicle and the obstacle have drawn near to each other (degree of convergence).

In order to calculate the risk potential RP, the controller 50 first calculates a time to collision TTC of the host vehicle with respect to the obstacle and a time to head way (following time) THW of the host vehicle with respect to the obstacle. The time to collision TTC is a physical quantity indicating the current degree of convergence of the host vehicle with respect to the preceding obstacle, e.g., a preceding vehicle. More specifically, the time to collision TTC is a value indicating the amount of time (e.g., number of seconds) until the following distance D becomes zero and the host vehicle contacts the preceding vehicle if the current traveling state continues, i.e., if the host vehicle speed Vh, the preceding vehicle speed Vf, and the relative velocity Vr remain constant. The relative velocity Vf is equal to the host vehicle speed Vh minus the speed of the preceding vehicle Vf, i.e., Vr=Vh−Vf. The time to collision TTC with respect to the preceding vehicle is found using the Equation 1 shown below.

$$TTC = D/Vr \qquad \text{(Equation 1)}$$

As the time to collision TTC becomes smaller, the collision with the preceding obstacle becomes more eminent and the degree of convergence with respect to the preceding obstacle becomes larger. For example, when approaching an obstacle, most drivers start taking action to decelerate before the time to collision TTC reaches 4 seconds or less. When an obstacle does not exist in front of the host vehicle, the time to collision TTC is infinity.

The time to head way THW is a physical quantity that is relevant when the host vehicle is following a preceding vehicle and indicates the degree of influence changes in the speed of the preceding vehicle (which are assumed to occur in the future) will have on the time to collision TTC, i.e., the degree of influence under the assumption that the relative velocity Vr will change. The time to head way THW is found using the Equation 2 shown below.

$$THW = D/V \qquad \text{(Equation 2)}$$

The time to head way THW equals the following distance divided by the host vehicle speed Vh and thus indicates the amount of time required for the host vehicle to move from its current position to the current position of the preceding vehicle. As the time to head way THW becomes larger, the smaller amount influence is that the surroundings have on the degree of convergence. In other words, when the time to head way THW is large, any future change in the speed of the preceding vehicle will not have a large effect on the degree of convergence between the host vehicle and the preceding vehicle and, thus, the time to collision TTC will not change very much. When the host vehicle is following a preceding vehicle and the host vehicle speed V equals the preceding vehicle speed Vf, then the preceding vehicle speed Vf can be used in Equation 2 instead of the host vehicle speed Vh to calculate the time to head way THW.

The risk potential RP is calculated with the Equation 3 below using the time to collision TTC and time to head way THW calculated in step S130.

$$RP = A/THW + B/TTC \qquad \text{(Equation 3)}$$

In the Equation 3, the terms A and B are constants serving to appropriately weight the inverse of the time to head way THW and the inverse of the time to collision TTC. The constants A and B are set in advance to appropriate values, e.g., A=1 and B=8 (A<B).

Figure 6:
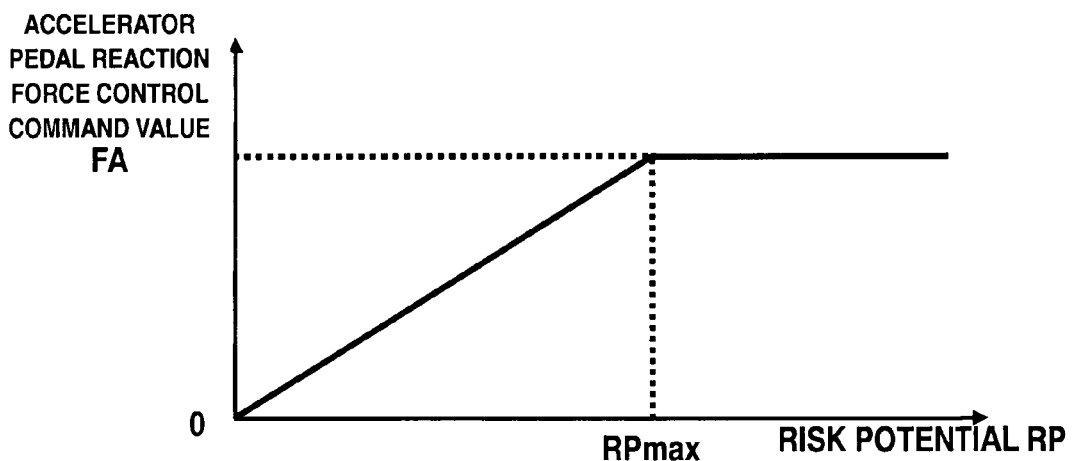
FIG. 6 is a plot of the accelerator pedal reaction force control command value versus the risk potential that is used with the vehicle driving assist system in accordance with the first embodiment of the present invention.

In step S140, the controller 50 calculates a control amount for the actuation reaction force to be exerted by (generated in) the accelerator pedal 72. The control amount is called the accelerator pedal reaction force control command value FA. FIG. 6 is a plot of the accelerator pedal reaction force control command value FA versus the risk potential RP. The accelerator pedal reaction force control command value FA is gradually increased as the risk potential RP increases and is fixed at a maximum value FAmax when the risk potential RP is equal to or larger than a maximum value RPmax.

In step S150, the controller 50 sends the accelerator pedal reaction force control command value FA calculated in step S140 to the accelerator pedal reaction force control device 60. The accelerator pedal reaction force control device 60 controls the actuation reaction force exerted by the accelerator pedal 62 based on the command value received from the controller 50. More specifically, the controller 50 adds the reaction force command value FA to a reaction force calculated using a normal reaction force characteristic based on the depression amount of the accelerator pedal 62 and causes the accelerator pedal 62 to exert a reaction force equal to the resulting sum value.

Figure 7:
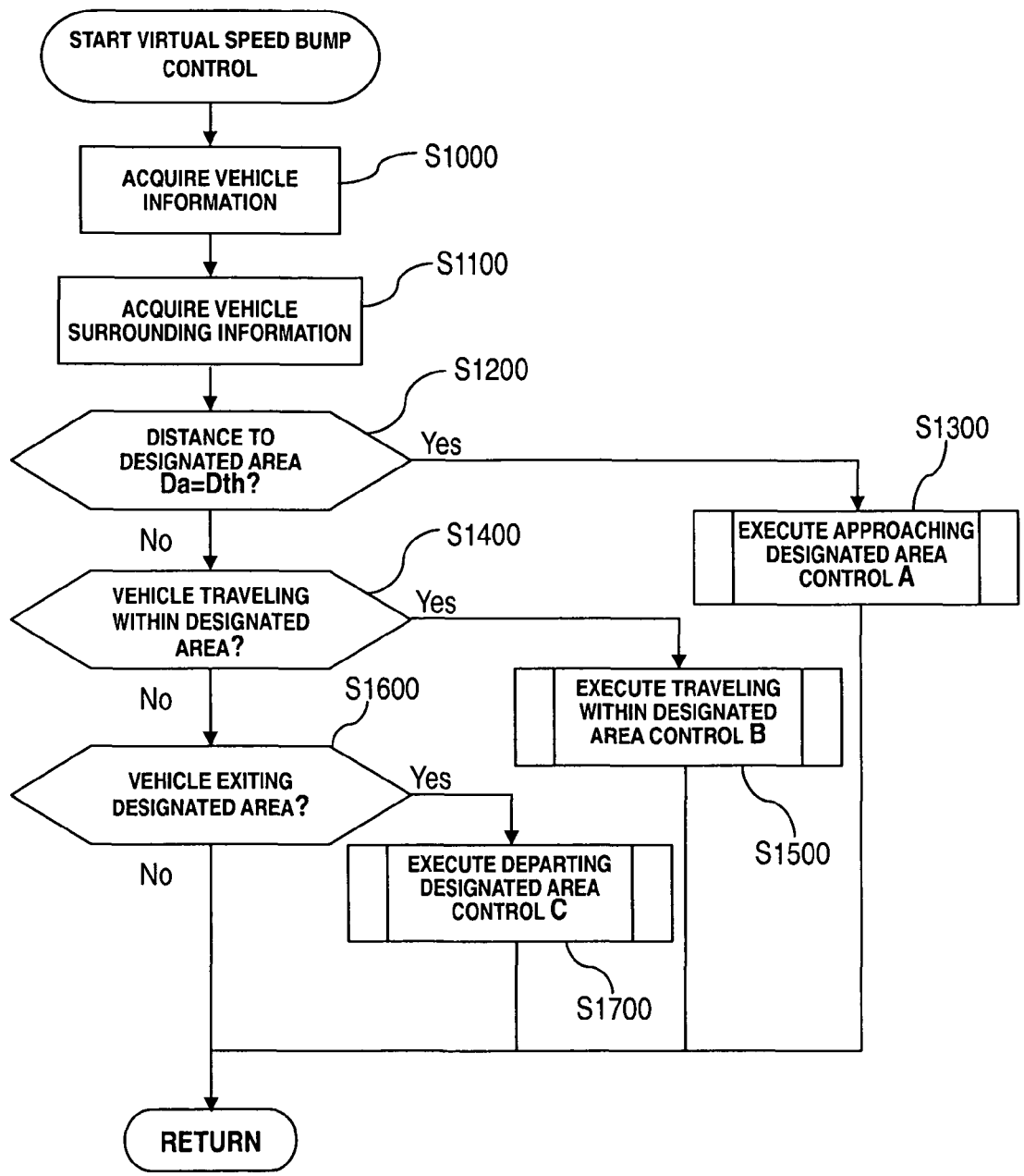
FIG. 7 is a flowchart of the virtual speed bump control showing the processing steps executed in order to accomplish virtual speed bump control (i.e., virtual speed limiting road protrusion control)

In step S160, the controller 50 executes virtual speed bump control. For the purposes of explaining the embodiment, the accelerator pedal actuation reaction force control will be explained first and the virtual speed bump control afterwards. However, the virtual speed bump control and the accelerator pedal actuation reaction force control are actually executed in parallel. In other words, a virtual speed bump or speed limiting protrusion will be generated whenever the host vehicle approaches a designated area even if an actuation reaction force corresponding to a risk potential RP is being generated in the accelerator pedal 62 at the same time. The control processing executed in order to accomplish accelerator pedal actuation reaction force control and virtual speed bump control will now be explained with reference to the flowchart of FIG. 7.

In step S1000, the controller 50 acquires vehicle information. The host vehicle information mentioned here is the host vehicle speed Vh detected by the host vehicle speed sensor 30 and the wheel base Lw of the host vehicle. The wheel base Lw is stored in the memory of the controller 50 in advance.

In step S1100, the controller 50 acquires surroundings information from the navigation system 10. The surroundings information is information related to designated areas existing in front of the host vehicle. More specifically, the navigation system 10 uses the current position of the host vehicle and the road information contained in the map database to determine if a designated area exists in front of the host vehicle and calculates the distance Da from the host vehicle to the designated area if a designated area exists. The determination as to whether or not a designated area exists and the distance Da constitute the surroundings information. When route guidance is being executed, the navigation system 10 determines if a designated area exists along the route. Otherwise, if route guidance is not being executed, the navigation system 10 determines if a designated area exists in front of the host vehicle along the direction in which the host vehicle is traveling.

A designated area is a region where it is likely that people and/or other vehicles will cross in front of the host vehicle such that it is necessary for the host vehicle to decelerate. Examples of designated areas include prescribed areas centered around schools (schools zones), areas surrounding nursery schools or other facilities attended by children, residential areas, areas surrounding day care facilities and areas surrounding nursing home facilities and other facilities serving the elderly (silver zones). The designated areas are stored in the map database of the navigation system 10 in advance and are set to, for example, coincide with school zones established in cities, towns, and rural communities or to encompass an appropriate radius around schools and other facilities.

In step S1200, the controller 50 determines if the distance Da to the designated area acquired in step S1100 is equal to a prescribed distance Dth. The prescribed distance Dth is a threshold value for determining if virtual speed bump control should be commenced and is set to, for example, 100 m (Dth=100 m). It is also possible to set Dth to have a range of plus or minus several meters in consideration of the processing cycle time. If Da=Dth, the controller 50 proceeds to step S1300 and executes an approaching designated area control A (described later).

If the result of step S1200 is negative, the controller 50 proceeds to step S1400 and determines if the host vehicle is traveling inside a designated area. The controller 50 determines if the host vehicle is inside a designated area by comparing the current position of the host vehicle to the designated area.

If it determines that the host vehicle is traveling inside a designated area, the controller 50 proceeds to step S1500 and executes a traveling within designated area control B (described later).

If the result of step S1400 is negative (No), the controller 50 proceeds to step S1600 and determines if the current position of the host vehicle has reached a border of the designated area and the host vehicle has departed (moved outside of) the designated area.

If the host vehicle has departed the designated area, the controller 50 proceeds to step S1700 and executes a departing designated area control C (described later).

FIG. 8 illustrates the relationship between the controls A to C and a school zone, which is one example or type of a designated area in which the present invention generates an imaginary speed limiting road protrusion such as a speed bump. Assuming the host vehicle is traveling in the direction of the arrow, the approaching designated area control A is executed when the distance Da from the host vehicle to the border Pa of the school zone falls to the prescribed value Dth. While the host vehicle is traveling inside the school zone, the traveling within designated area control B is executed until the host vehicle reaches the border Pb of the school zone. When the host vehicle reaches the border Pb, the departing designated area control C is executed.

First, the processing steps executed by the controller 50 for performing the approaching designated area control A of step S1300 will be explained using the flowchart of FIG. 9.

In step S1310, the controller 50 determines whether or not to execute virtual speed bump control. The controller 50 determines that virtual speed bump control should be executed when both of the following conditions (a) and (b) are satisfied.

Condition (a): The host vehicle speed Vh is within a prescribed range (V1<Vh<V2).

Condition (b): The current time of day corresponds to a prescribed control execution time period assigned to the designated area.

Regarding the condition (a), the prescribed values V1 and V2 are, for example, 10 km/h and 60 km/h, respectively. If the host vehicle speed Vh is higher than the prescribed value V2, the controller 50 does not execute virtual speed bump control because there is the possibility that the excessively heavy braking will result if a virtual speed bump is generated. If the host vehicle speed Vh is lower than the prescribed value V1, the controller 50 does not execute virtual speed bump control because it can be assumed that a designated area has already been recognized and the host vehicle is traveling slowly.

Regarding the condition (b), the control execution time periods are established for each designated area as indicated in FIG. 10. Depending on the type of specialized area, there are times of day when few people and vehicles are coming and going. When the current time does not correspond to the control execution time period of the specialized area the host vehicle is approaching, the controller 50 does not execute virtual speed bump control.

If both of the conditions (a) and (b) are satisfied, the controller 50 determines that virtual speed bump control should be executed and proceeds to step S1320. If either one or both of the conditions (a) and (b) is not satisfied, the controller 50 ends the control routine.

In step S1320, the controller 50 determines the size of the imaginary speed limiting road protrusion and selects the braking force control method to be used in order to generate the imaginary speed limiting road protrusion. The size, i.e., the shape, of the imaginary speed limiting road protrusion is calculated as a braking force control amount that is suitable to reproduce the behavior that the host vehicle would exhibit if it crossed over a speed bump installed on a road and serves to generate the shock associated with crossing over the imaginary speed limiting road protrusion.

Figure 11:
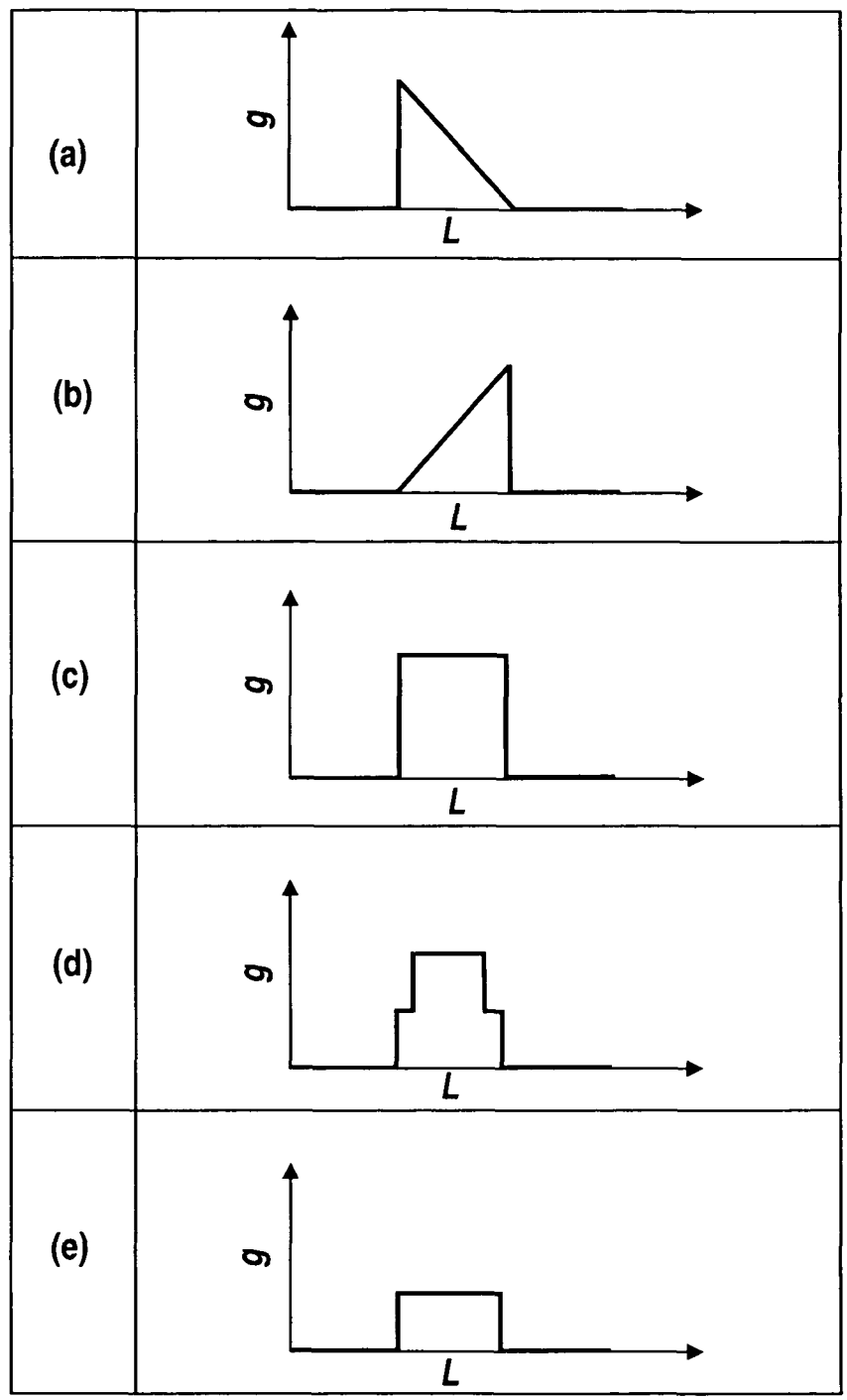
FIG. 11 is a series of graphs showing exemplary shapes of the imaginary speed limiting road protrusions (e.g., imaginary speed bumps) generated by the braking force control.

FIG. 11 show examples (a) to (e) of braking force control amounts. Similarly to an actual physical speed bump (imaginary speed limiting road protrusion) existing on a road as shown in FIG. 3, an imaginary speed limiting road protrusion is assumed to be installed in a predetermined place on a road and the braking force control amount is defined based on the relationship of an acceleration due to gravity g with respect to the distance L. The distance L is, for example, the distance that will be traveled from the point where it was determined to start the approaching designated area control A. The acceleration due to gravity g corresponds to the deceleration that the host vehicle will be caused to undergo. In this embodiment, the controller 50 selects one of the imaginary speed limiting road protrusion shapes shown in FIG. 1 and calculates a relationship of the acceleration due to gravity g versus the travel distance L to serve as the braking force control amount.

During the course of the approaching designated area control A, the imaginary speed bump or imaginary speed limiting road protrusion is generated three times. Assuming the first time the imaginary speed limiting road protrusion is generated occurs at a time Tn=0, the timing of the next imaginary speed limiting road protrusion, i.e., the time $T_{n+1}$ until the next imaginary speed limiting road protrusion is generated, is calculated with the Equation 4 below using the host vehicle speed Vh.

$$T_{n+1}=(Ls+Lp)/Vh \qquad \text{(Equation 4)}$$

In the equation, Ls is the width of one of the imaginary speed limiting road protrusions (e.g., imaginary speed bumps) and Lp is the distance (speed bump pitch) from the center of one imaginary speed limiting road protrusion to the center of the next imaginary speed limiting road protrusion. The imaginary speed limiting road protrusion width Ls and speed bump pitch Lp are set to appropriate values in advance in accordance with the imaginary speed limiting road protrusion shape.

Next, a rear wheel control delay time Tr is calculated for the purpose of expressing the host vehicle behavior that results when the rear wheels pass over the imaginary speed limiting road protrusions (e.g., imaginary speed bumps) after the front wheels. In other words, the braking control associated with the rear wheels is started when the amount of time Tr has elapsed since the braking control associated with the front wheels was started. The control delay time Tr is calculated with the Equation 5 below using the host vehicle speed Vh and the wheel base Lw.

$$Tr = Lw/Vh \quad \text{(Equation 5)}$$

Figure 12:
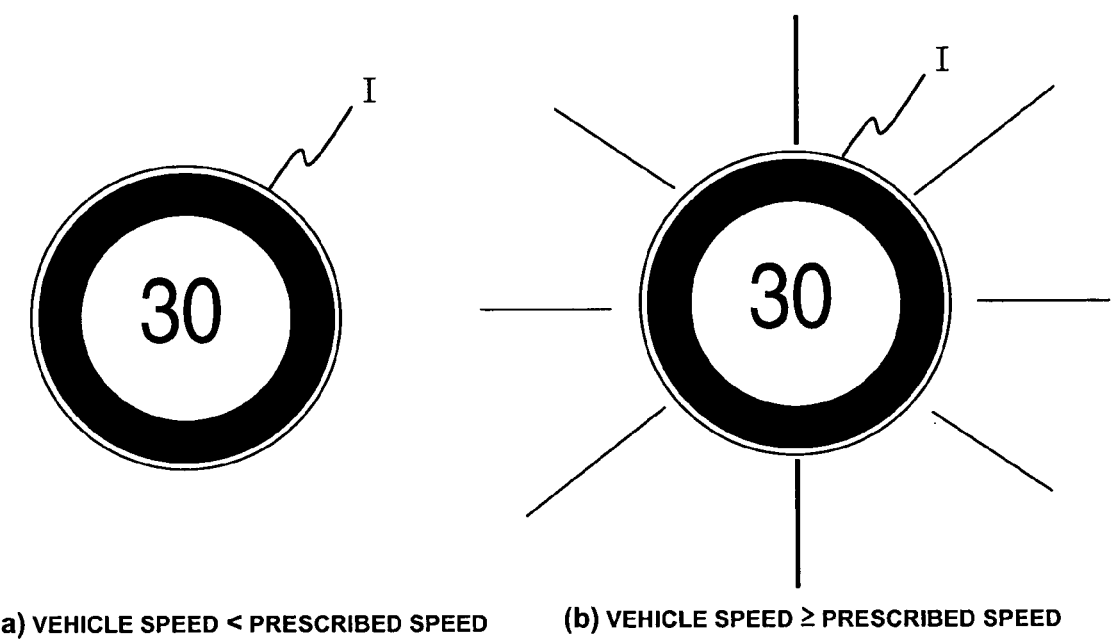
FIG. 12 is a pair of examples of how the speed limit is displayed depending on the host vehicle speed.

After determining the control method for generating the imaginary speed bump or imaginary speed limiting road protrusion, the controller 50 proceeds to step S1330. In step S1330, the controller 50 acquires the speed limit of the road on which the host vehicle is traveling from the navigation system 10 and sends a command to the visual information presenting device 85 instructing it to present a speed limit display suited to the current vehicle speed Vh of the host vehicle. Examples of speed limit displays are shown in FIG. 12. The diagram (a) of FIG. 12 shows the speed limit display for a case in which the speed limit is 30 km/h and the host vehicle speed Vh is lower than the speed limit. In such a case, the display I is illuminated. The diagram (b) of FIG. 12 shows the speed limit display for a case in which the host vehicle speed Vh is equal to or larger than the speed limit. When the host vehicle speed Vh is larger than or equal to the speed limit, the display I is flashed. The visual information presenting device 85 can be configured to display the information on, for example, the display monitor of the navigation system 10. It is also possible to set a recommended speed based on the speed limit to be recommended when the host vehicle is traveling near or inside a designated area and to display the recommended speed depending on the host vehicle speed Vh.

When the first imaginary speed bump or imaginary speed limiting road protrusion is generated (n=0), the controller 50 sends a command to the audio information presenting device 80 instructing it to generate an alarm sound in two single bursts in order to inform the driver that the specialized area approach control A has started. In response to the command, the audio information presenting device 80 generates an alarm sound, e.g., two short beeps, from the speaker.

In step S1340, the controller 50 issues a command to the brake control device 70 instructing it to generate a braking force control amount corresponding to the travel distance L calculated in step S1320. In response to the signal from the controller 50, the braking force control device 70 first controls the brake fluid pressure supplied to the right front wheel cylinder 705FR and the left front wheel cylinder 705FL. Then, it controls the brake fluid pressure supplied to the right rear wheel cylinder 705RR and the left rear wheel cylinder 705RL. As a result, the braking forces of the front wheels and the rear wheels are controlled so as to cause the host vehicle to decelerate in a manner resembling the way the host vehicle would decelerate if it passed over a speed limiting road protrusion such as a speed bump. In other words, an imaginary speed limiting road protrusion (e.g., imaginary speed bump) is generated. When the braking force control for generating an imaginary limiting road protrusion has been executed with respect to the front wheels, the braking force control is executed with respect to the rear wheels as well, regardless of the previously described control execution conditions (a) and (b).

In step S1350, the controller 50 issues a command to the accelerator pedal reaction force control device 60 instructing it to add a pulsed supplemental reaction force ΔFp to the accelerator pedal 62 in synchronization with the timing at which the host vehicle passes over the imaginary speed limiting road protrusion. The supplemental reaction force ΔFp is set to such a magnitude that the driver can be reliably informed that the accelerator pedal actuation reaction force has changed and is generated in the accelerator pedal 62 during the period when the braking forces of the front wheels are being controlled in order to generate the imaginary speed limiting road protrusion. As a result, the accelerator pedal 62 exerts an actuation reaction force equal to the sum of the reaction force control command value FA corresponding to the risk potential RP and the supplemental reaction force ΔFp.

In step S1360, the controller 50 increments a counter that indicates the number of times n the imaginary speed limiting road protrusion has been generated. In step S1370, the controller 50 waits until it is time to generate the next imaginary speed limiting road protrusion, i.e., until the time Tn+1 has elapsed since the braking force control of the front wheels was started in step S1340 in order to generate the imaginary speed limiting road protrusion. When the time Tn+1 has elapsed, the controller 50 proceeds to step S1380 and determines the number of times n the speed bump has been generated. If the number of times n the imaginary speed limiting road protrusion has been generated is less than 3 (n<3), the controller 50 returns to step S1320 and executes control to generate the next imaginary speed limiting road protrusion. If the number of times n equals 3, the controller 50 ends this control routine (ends the approaching designated area control A).

Next, the processing steps for executing the traveling within designated area control B of step S1500 will be explained using the flowchart of FIG. 13.

In step S1510, the controller 50 determines whether or not to execute virtual speed bump control. The controller 50 determines that virtual speed bump control should be executed when both of the aforementioned conditions (a) and (b) used for determining if the approaching designated area control A should be executed are satisfied. If either one (or both) of the conditions (a) and (b) is not satisfied, the controller 50 ends this control routine (ends the traveling within designated area control B).

In step S1520, the controller 50 determines the size of the imaginary speed limiting road protrusion and selects the braking force control method to be used in order to generate the imaginary speed limiting road protrusion. The control method and the shape of the imaginary speed limiting road protrusion are determined using a procedure similar to that used in step S1320 of the approaching designated area control A. Different shapes of imaginary speed limiting road protrusion (e.g., imaginary speed bump) can be prepared for the traveling within designated area control B than are used in the approaching designated area control A. For example, in the traveling within designated area control B, the size of each imaginary speed limiting road protrusion can be set smaller, i.e., the sizes of the accelerations due to gravity g shown in FIG. 11 can be set to smaller values, such that the driver can be informed in a continuous manner that the host vehicle is already traveling inside a designated area. Also, the speed bump pitch Lp for determining the time Tn+1 at which the next imaginary speed limiting road protrusion (e.g., imaginary speed bump) will be generated can be set differently than in the approaching designated area control A.

After determining the control method for generating the imaginary speed limiting road protrusion (e.g., imaginary speed bump), the controller 50 proceeds to step S1530. In step S1530, as it does in approaching designated area control A, the controller 50 sends a command to the visual information presenting device 85 instructing the visual information presenting device 85 to continuously present a speed limit display (warning signal) suited to the current vehicle speed Vh of the host vehicle. Also, the controller 50 sends a command to the audio information presenting device 80 instructing it to generate a continuous alarm sound (warning signal) while the imaginary speed limiting road protrusions are being generated. In response to the command, the audio information presenting device 80 generates an alarm sound, e.g., a single continuous beep sound, from the speaker.

In step S1540, the controller 50 issues a command to the brake control device 70 instructing it to generate a braking force control amount corresponding to the travel distance L calculated in step S1520. The brake control device 70 controls the brake fluid pressures supplied to each of the wheel cylinders (left and right, front and rear) 705FR, 705FL, 705RR, 705RL. As a result, the braking forces of the front wheels and the rear wheels are controlled so as to cause the host vehicle to decelerate in a manner resembling the way the host vehicle would decelerate if it were passing over a speed bump. In other words, an imaginary speed limiting road protrusion is artificially generated. When the braking force control for generating an imaginary speed limiting road protrusion has been executed with respect to the front wheels, the braking force control is executed with respect to the rear wheels as well, regardless of the previously described control execution conditions (a) and (b).

In step S1550, the controller 50 issues a command to the accelerator pedal reaction force control device 60 instructing it to add a pulsed supplemental reaction force $\Delta Fp$ to the accelerator pedal 62 in synchronization with the timing at which the host vehicle passes over the imaginary speed limiting road protrusion.

In step S1560, the controller 50 waits until it is time to generate the next imaginary speed limiting road protrusion, i.e., until the time Tn+1 has elapsed since the braking force control of the front wheels was started in step S1540 in order to generate the imaginary speed limiting road protrusion. When the time Tn+1 has elapsed, the controller 50 proceeds to step S1570 and determines if the host vehicle speed Vh is within a prescribed range. If the host vehicle speed Vh is within the range V1<Vh<V2 (where, for example, V1=10 km/h and V2=60 km/h), the controller 50 returns to step S1520 and executes control for generating the next imaginary speed limiting road protrusion (e.g., imaginary speed bump). If the host vehicle speed Vh is equal to or below V1 or equal to or above V2, the controller 50 ends this control routine.

An amount of hysteresis is included in the prescribed ranged that the host vehicle speed Vh is compared to in step S1570. More specifically, the result of step S1570 is positive (Yes) when the host vehicle speed Vh is smaller than the sum of the prescribed value V2 and an amount $\Delta V$ (e.g., $\Delta V$=+5 km/h).

Finally, the processing steps for executing the departing designated area control C of step S1700 will be explained using the flowchart of FIG. 14. In step S1710, the controller 50 determines whether or not to execute virtual speed bump control. The controller 50 determines that virtual speed bump control should be executed when both of the aforementioned conditions (a) and (b) used for determining if the approaching designated area control A should be executed are satisfied. If either one (or both) of the conditions (a) and (b) is not satisfied, the controller 50 ends this control routine (ends the departing designated area control C). In step S1720, the controller 50 determines the size of the imaginary speed limiting road protrusion (e.g., imaginary speed bump) and selects the braking force control method to be used in order to generate the imaginary speed limiting road protrusion. The control method and the shape of the imaginary speed limiting road protrusions are determined using a procedure similar to that used in step S1320 of the approaching designated area control A.

After determining the control method for generating the imaginary speed limiting road protrusion, the controller 50 proceeds to step S1730. In step S1730, as it does in approaching designated area control A, the controller 50 sends a command to the visual information presenting device 85 instructing the visual information presenting device 85 to present a speed limit display suited to the current vehicle speed Vh of the host vehicle. When the first imaginary speed limiting road protrusion is generated (n=0), the controller 50 sends a command to the audio information presenting device 80 instructing it to generate an alarm sound in one single burst in order to inform the driver that the departing designated area control C has started. In response to the command, the audio information presenting device 80 generates an alarm sound, e.g., one short beep, from the speaker.

In step S1740, the controller 50 issues a command to the brake control device 70 instructing it to generate a braking force control amount corresponding to the travel distance L calculated in step S1720. The brake control device 70 controls the brake fluid pressures supplied to each of the wheel cylinders (left and right, front and rear) 705FR, 705FL, 705RR, 705RL. As a result, the braking forces of the front wheels and the rear wheels are controlled so as to cause the host vehicle to decelerate in a manner resembling the way the host vehicle would decelerate if it passed over a speed bump. In other words, an imaginary speed limiting road protrusion is artificially generated. When the braking force control for generating an imaginary speed limiting road protrusion has been executed with respect to the front wheels, the braking force control is executed with respect to the rear wheels as well, regardless of the previously described control execution conditions (a) and (b).

In step S1750, the controller 50 issues a command to the accelerator pedal reaction force control device 60 instructing it to add a pulsed supplemental reaction force $\Delta Fp$ to the accelerator pedal 62 in synchronization with the timing at which the host vehicle passes over the imaginary speed limiting road protrusion. In step S1760, the controller 50 increments a counter that indicates the number of times n the imaginary speed limiting road protrusion (e.g., imaginary speed bump) has been generated. In step S1770, the controller 50 waits until it is time to generate the next imaginary speed limiting road protrusion, i.e., until the time Tn+1 has elapsed since the braking force control of the front wheels was started in step S1740 in order to generate the imaginary speed limiting road protrusion. When the time Tn+1 has elapsed, the controller 50 proceeds to step S1780 and determines the number of times n the speed bump has been generated. If the number of times n the imaginary speed limiting road protrusion has been generated is less than 2, the controller returns to step S1720 and executes control to generate the next imaginary speed limiting road protrusion. If the number of times n equals 2, the controller 50 ends this control routine (ends the departing designated area control C).

The operational effects of a vehicle driving assist system 1 in accordance with the first embodiment of the present invention will now be explained with reference to the drawings. FIG. 15 summarizes the control operations that are executed during the approaching designated area control A, the traveling within designated area control B, and the departing designated area control C.

The approaching designated area control A is executed if the host vehicle speed Vh is within a prescribed range when the distance Da from the host vehicle to the specialized area has fallen to a prescribed value Dth. During the approaching designated area control A, the system 1 artificially generates an imaginary speed limiting road protrusion (e.g., imaginary speed bump) three times, thereby causing the host vehicle to decelerate in such a fashion as to give the driver the sensation that the host vehicle is passing over three speed bumps. Also, the system 1 causes the accelerator pedal 62 to exert a pulsed supplemental reaction force $\Delta$Fp at timings synchronized with the generation of the imaginary speed limiting road protrusions. When the imaginary speed limiting road protrusions are generated, the system 1 also displays an image dependent on the speed limit and the host vehicle speed Vh as shown in FIG. 12 and generates an alarm sound in short-burst beeps in order to inform the driver that the approaching designated area control A has started.

Figure show how the imaginary speed limiting road protrusion generation state, the braking control execution state, and the information presented change with time during the approaching designated area control A. When the distance Da from the host vehicle to the designated area falls to the prescribed value Dth, the system 1 executes braking force control of the front wheels at a time Tn in order to cause the host vehicle to decelerate in such a fashion as to mimic the behavior the host vehicle would exhibit if the front wheels of the host vehicle were passing over a speed bump, i.e., to decelerate in such a fashion as to generate an imaginary speed limiting road protrusion with respect to the front wheels. At the same time, the system 1 causes the accelerator pedal 62 to exert a pulsed supplemental reaction force $\Delta$Fp. The image dependent on the speed limit and the host vehicle speed Vh is displayed on a display monitor of the visual information presenting device 85. When a control delay time Tr has elapsed, the system 1 executes a braking force control with respect to the rear wheels in order to cause the host vehicle to decelerate in such a fashion as to mimic the behavior the host vehicle would exhibit if the rear wheels of the host vehicle were passing over a speed bump, i.e., to decelerate in such a fashion as to generate an imaginary speed limiting road protrusion with respect to the rear wheels At the next execution timing Tn+1 calculated based on the host vehicle speed Vh, the system 1 executes braking force control with respect to the front wheels so as to generate a second imaginary speed limiting road protrusion and reaction force control so as to cause the accelerator pedal 62 to exert a pulsed supplementary reaction force $\Delta$Fp. The system executes braking force control with respect to the rear wheels when the control delay time Tr has elapsed. At the next execution timing Tn+2 calculated based on the host vehicle speed Vh, the system 1 executes braking force control with respect to the front wheels so as to generate a third imaginary speed limiting road protrusion and then executes braking force control with respect to the rear wheels. The system 1 also causes accelerator pedal 62 to exert the supplementary force $\Delta$Fp.

During the traveling within designated area control B, the system 1 generates imaginary speed limiting road protrusions continuously if the host vehicle speed Vh is within a prescribed range. Also, the system 1 causes the accelerator pedal 62 to exert a supplemental reaction force $\Delta$Fp synchronized with the generation of the imaginary speed limiting road protrusions. At the same time, the system 1 displays an image corresponding to the host vehicle speed Vh and the speed limit and generates a continuous alarm sound (single continuous beep) to inform the driver that the traveling within designated area control B is in progress.

During the departing designated area control C, the system 1 generates an imaginary speed limiting road protrusion two times if the host vehicle speed Vh is within a prescribed range. Also, the system 1 causes the accelerator pedal 62 to exert a supplemental reaction force $\Delta$Fp synchronized with the generation of the imaginary speed limiting road protrusions. At the same time, the system 1 displays an image corresponding to the host vehicle speed Vh and the speed limit and generates a single-burst alarm sound (single short beep) to inform the driver that the departing designated area control C is in progress and the virtual speed bump control will soon end.

The first embodiment described heretofore can thus provide the following operational effects.

The vehicle driving assist system 1 of this first embodiment is configured to detect at least the distance D between the host vehicle in which the system 1 is installed and an obstacle existing in front of the host vehicle and the speed Vh of the host vehicle in which the system 1 is installed. The system 1 then calculates a risk potential RP indicating a degree of convergence between the host vehicle and the obstacle based on the detected values. Then, based on the risk potential RP, the system 1 controls an actuation reaction force exerted by a driver-operated driving operation device of the host vehicle, e.g., the accelerator pedal 62. Additionally, the system 1 executes control that creates an imaginary speed limiting road protrusion by artificially reproducing the behavior that the host vehicle exhibits when it crosses a speed limiting road protrusion arranged on a road surface. In this way, the situation regarding an obstacle in front of the host vehicle can be conveyed to the driver in a continuous manner via the actuation reaction force of a driver-operated driving operation device and, at the same time, the host vehicle can be decelerated in an effective manner by the creation of the imaginary speed limiting road protrusion. Speed bumps provided on roads are an effective way of urging drivers to slow down (decelerate), but they have the drawback that they are expensive to install. By providing a system that can create an imaginary speed limiting road protrusion(s), a driver can be urged to slow down in a manner similar to that accomplished with a real speed bump but without the cost of actually providing a real speed bump.

The vehicle driving assist system 1 is configured to detect a designated area where it is necessary for the host vehicle to decelerate and generate an imaginary speed limiting road protrusion to alert the passengers in the host vehicle, particularly the driver that the host vehicle is traveling in the vicinity of or inside a designated area. As a result, the driver can be effectively urged to slow down in situations where it is necessary to slow down.

The controller 50 is configured to detect either school zones, residential areas, silver zones, or areas surrounding kindergartens (or other children's facilities) as designated areas and determine the positional relationship between the host vehicle and a detected designated area based on information obtained from the navigation system 10. Thus, by recognizing such areas as areas where many people and vehicles are coming and going and it is preferable to significantly reduce the speed of the host vehicle in which the system 1 is installed, the system 1 can urge the driver to perform an appropriate driving operation by generating an imaginary speed limiting road protrusion.

The brake control device 70 is configured to generate an imaginary speed limiting road protrusion or speed limiting road protrusion by controlling the braking forces of both the front wheels and the rear wheels of the host vehicle. More specifically, the brake control device 70 controls the braking forces of the front wheels first and controls the braking forces of the rear wheels afterward so as to reproduce the sensation of deceleration that one feels when riding in a vehicle that is passing over a speed bump. By controlling the braking forces of the front wheels and the rear wheels independently, a sensation very much like the sensation experienced when the front wheels and rear wheels of a vehicle pass over a speed bump can be imparted to the driver and the driver can be urged to slow down in an effective manner.

The controller 50 is configured to change the method by which it generates the imaginary speed limiting road protrusion in accordance with whether the host vehicle is approaching a designated area but has not yet entered the designated area, is traveling inside a designated area, or is departing a designated area. More specifically, depending on whether the host vehicle is approaching, traveling inside, or departing a designated area, the controller 50 changes the conditions that need to be satisfied before an imaginary speed limiting road protrusion is generated, the number of times the imaginary speed limiting road protrusion will be generated, and the shape of the imaginary speed limiting road protrusion. As a result, the driver can be reliably informed as to whether the host vehicle is traveling near the perimeter of a designated area or traveling inside a designated area.

When the host vehicle is approaching a designated area, an imaginary speed limiting road protrusion is generated when the distance Da from the host vehicle to the designated area falls to a prescribed distance Dth. As a result, the system can reliably inform the driver in advance that the host vehicle is approaching a designated area and it is necessary to slow down.

The controller 50 is configured to generate an imaginary speed limiting road protrusion when the host vehicle speed Vh is larger than a prescribed speed V1 (first prescribed speed). The prescribed speed V1 is a value set in order to define a low speed region. Since the controller 50 does not generate an imaginary speed limiting road protrusion when the host vehicle is traveling at such a low speed that deceleration is not necessary, the system does not annoy the driver by producing unnecessary imaginary speed limiting road protrusions.

The controller 50 is configured not to generate an imaginary speed limiting road protrusion when the host vehicle speed Vh exceeds a prescribed speed V2 (second prescribed speed) that is larger than the first prescribed speed V1. The prescribed speed V2 is a value set in order to define a high speed region. As a result, the host vehicle behavior can be prevented from undergoing a severe change caused by the generation of a speed bump while the host vehicle is traveling at a high speed.

The controller 50 is configured to detect whether the designated area is a school zone, residential area, silver zone, or an area surrounding a kindergarten (or other children's facility) and to restrict the generation of imaginary speed limiting road protrusions to certain predetermined times of day if the detected designated area falls into one of these categories. More specifically, as shown in FIG. 10, certain times of day are set as execution time periods during which many vehicles and people are coming and going and the controller 50 does not generate an imaginary speed limiting road protrusion if the current time of day is outside the respective execution time period. The virtual speed bump control cannot remove a physical speed bump that actually exists on the road, but by generating imaginary speed limiting road protrusions, it can effectively urge the driver to slow down during time periods when it is highly likely that it will be necessary to slow down depending on the type of designated area.

The vehicle driving assist system 1 is also preferably equipped with the visual information presenting device 85 that is configured to present visual information to inform the driver than an imaginary speed limiting road protrusion is being generated. By displaying an image like those shown in FIG. 12, the visual information presenting device 85 can visually inform the driver of an appropriate speed that the host vehicle should target when an imaginary speed limiting road protrusion is being generated.

The vehicle driving assist system 1 is also preferably equipped with the audio information presenting device 80 that is configured to present audio information to inform the driver than an imaginary speed limiting road protrusion is being generated. More specifically, the audio information presenting device 80 issues a different alarm sound depending on whether the imaginary speed limiting road protrusion is being generated while the host vehicle is approaching a designated area, traveling within a designated area, or departing a designated area. As a result, the driver can be informed of the control state of the host vehicle by means of audio information.

Second Embodiment

Figure 17:
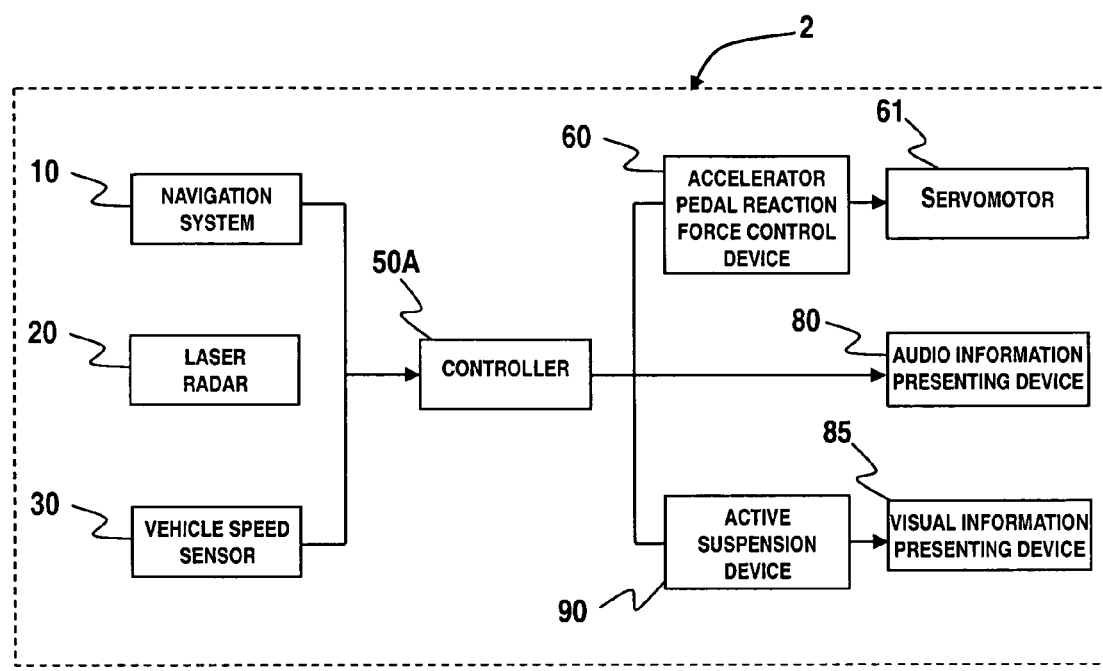
FIG. 17 is a system diagram of a vehicle driving assist system in accordance with a second embodiment of the present invention.

A vehicle driving assist system in accordance with a second embodiment of the present invention will now be explained. FIG. 17 is a system diagram of the vehicle driving assist system 2 in accordance with the second embodiment. In FIG. 17, parts having the same functions as the parts of the first embodiment shown in FIGS. 1 and 2 are indicated with the same reference numerals. The second embodiment will be explained chiefly by describing its differences with respect to the first embodiment.

As shown in FIG. 17, the vehicle driving assist system 2 includes an active suspension device 90. The active suspension device 90 is configured to control the hydraulic pressure of hydraulic cylinders installed between each of the wheels and the host vehicle body and thereby control changes in the attitude of the host vehicle body. In this embodiment, a controller 50A controls the active suspension device 90 in such a manner as to give the driver a sensation of deceleration that driver might experience if the host vehicle was crossing over a speed bump. In other words, the controller 50A generates an imaginary speed limiting road protrusion (e.g., imaginary speed bump) by controlling the active suspension device 90.

Figure 18:
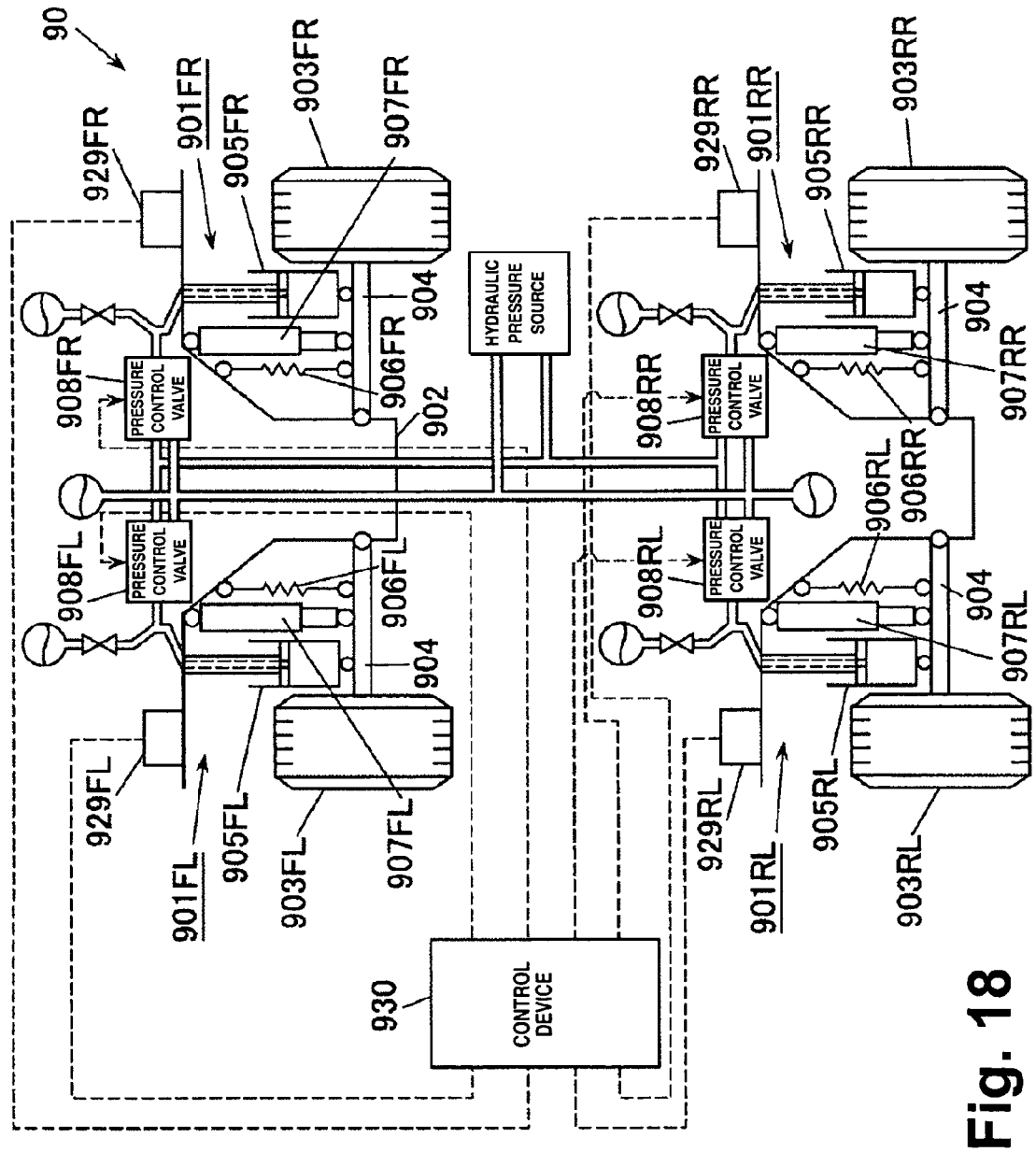
FIG. 18 is schematic view of the active suspension device in accordance with the second embodiment of the present invention.

FIG. 18 is a schematic view of the active suspension device 90. The active suspension device 90 includes active suspensions 901FR, 901FL, 901RR, and 901RL that are installed between a vehicle body side member 902 and wheel side members 904 supporting each of the wheels (front and rear, left and right) 903FR, 903FL, 903RR, 903RL. The active suspension device 90 also includes a control device 930.

Each of the active suspensions 901FR, 901FL, 901RR, 901RL includes a hydraulic cylinder 905FR, 905FL, 905RR, 905RL and a coil spring 906FR, 906FL, 906RR, 906RL that serve as an actuator, a shock absorber 907FR, 907FL, 907RR, 907RL that serves as a damping mechanism, and a pressure control valve 908FR, 908FL, 908RR, 908RL for controlling the hydraulic fluid pressure of the hydraulic cylinders 905FR to 905RL. Four vehicle body vertical acceleration detecting devices 929FR, 929FL, 929RR, 929RL are provided on the host vehicle body directly above each of the wheels 903FR to 903RL, respectively. Signals indicating the vertical acceleration values detected by the vertical acceleration detecting devices 929FR to 929RL are fed to the control device 930.

For example, when the host vehicle is turning right and the host vehicle body undergoes a roll phenomenon in which it slants downward to the left, a positive vertical acceleration detection signal is issued from the vertical acceleration detecting devices 929FR and 929RR corresponding to the right wheels and a negative vertical acceleration detection signal is issued from the vertical acceleration detecting devices 929FL and 929RL corresponding to the left wheels In such a case, the control device 930 reduces the excitation current of the solenoids of the pressure control valves 908FR and 908RR and increases the excitation current of the solenoids of the pressure control valves 908FL and 908RL, thereby causing the right-hand hydraulic cylinders 905FR and 905RR to shorten (contract) and the left-hand hydraulic cylinders 905FL and 905RL to extend. As a result, an anti-roll effect can be achieved.

In the second embodiment, the sensation of deceleration that constitutes the host vehicle passing over an imaginary speed limiting road protrusion (e.g., imaginary speed bump) is created by controlling the suspension stroke amounts S which the hydraulic cylinders 905FR and 905FL of the front wheels and the hydraulic cylinders 905RR and 905RL of the rear wheels are extended or contracted.

Figure 19:
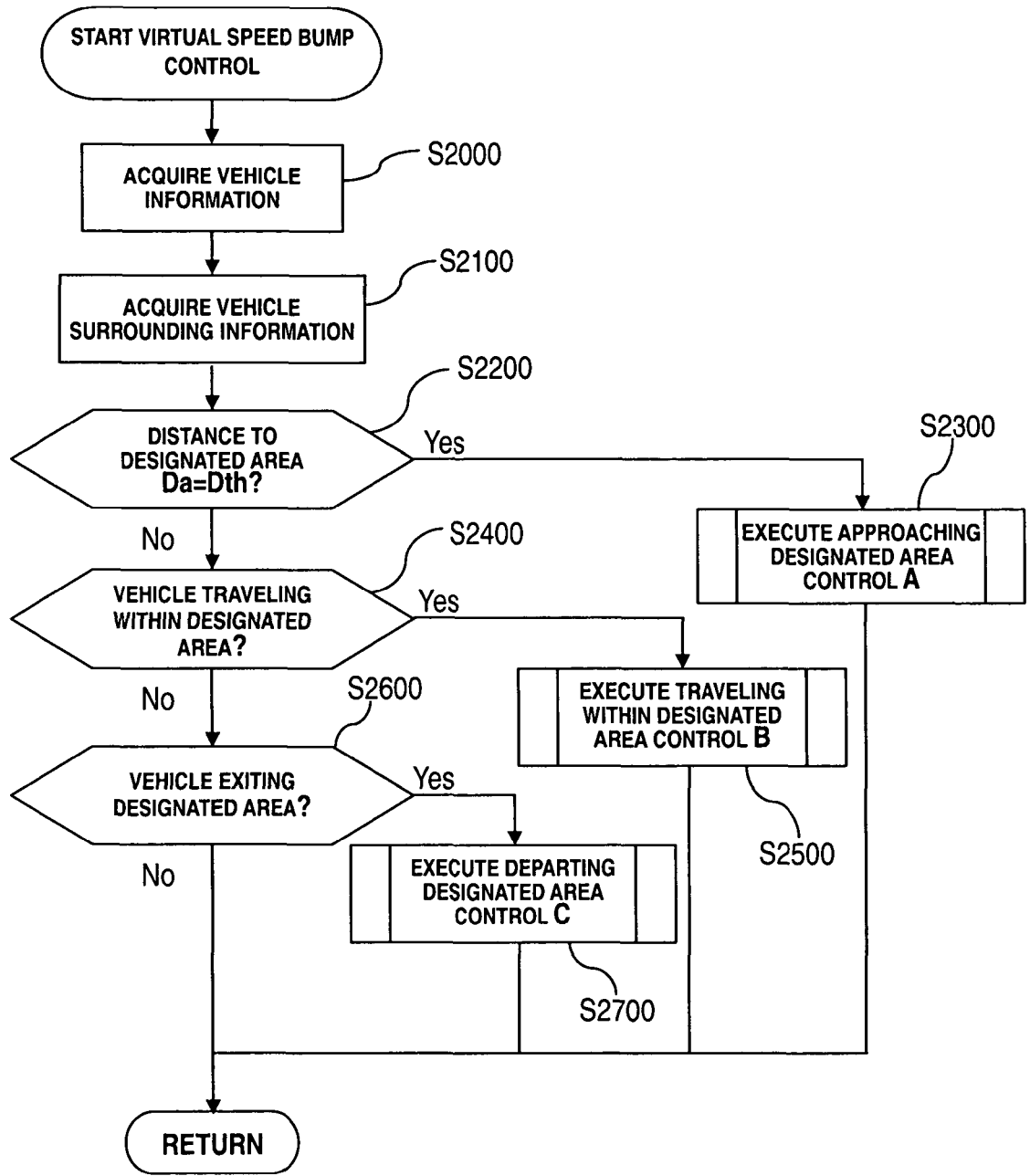
FIG. 19 is a flowchart showing the processing steps of a virtual speed bump control in accordance with the second embodiment of the present invention.

The operation of a vehicle driving assist system 2 in accordance with the second embodiment will now be explained. FIG. 19 is a flowchart showing the processing steps executed in order to accomplish the virtual speed bump control. These processing steps are executed in step S160 of the flowchart shown in FIG. 5. Steps S2000 to S2200, S2400, and S2600 are the same as steps S1000 to S1200, S1400, and S1600 of the flowchart shown in FIG. 7. The control processing will now be explained that is executed in step S2300 to accomplish the approaching designated area control A, that is executed in step S2500 to accomplish the traveling within designated area control B, and that is executed in step S2700 to accomplish the departing designated area control C.

Figure 20:
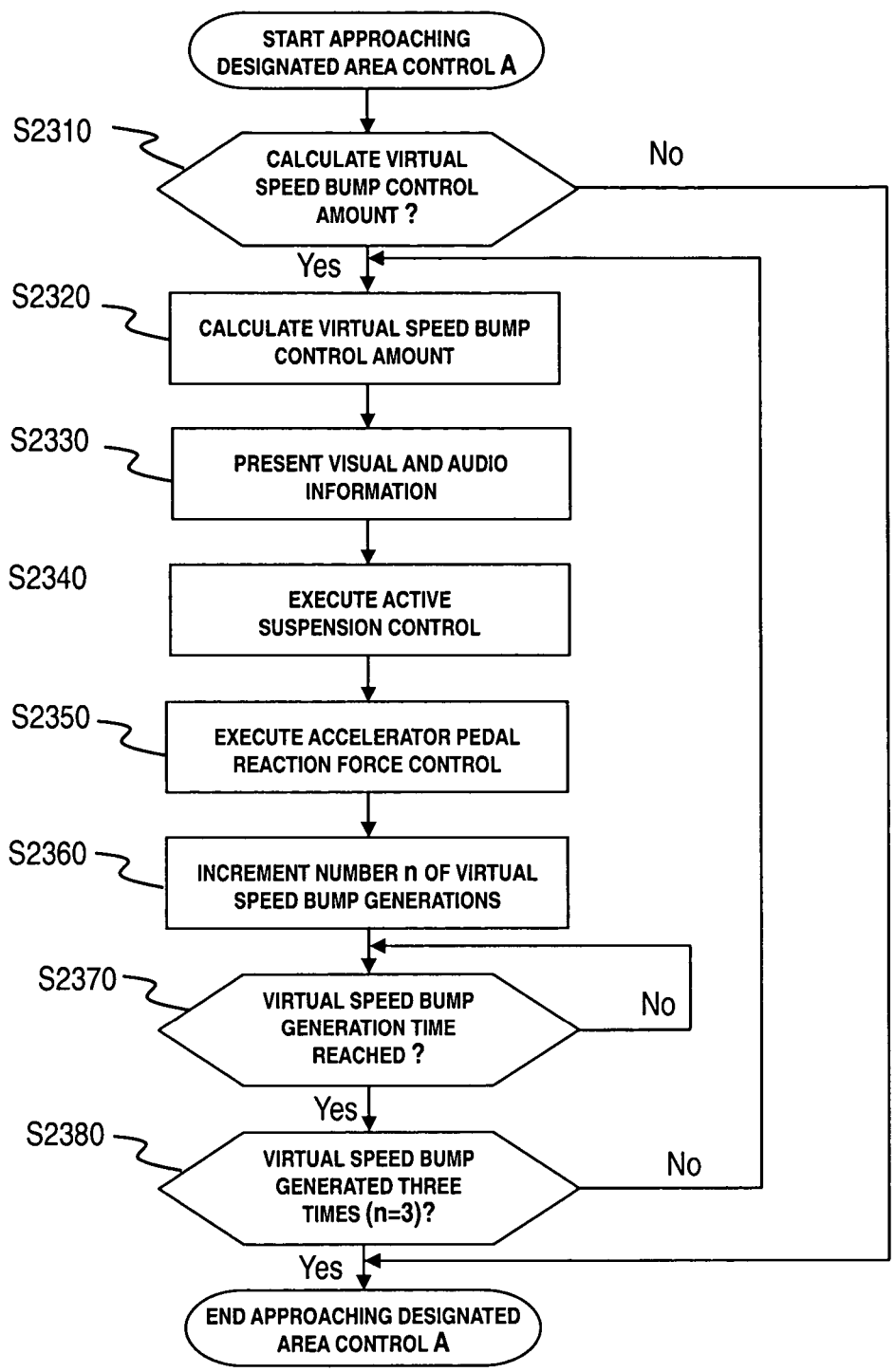
FIG. 20 is a flowchart for explaining the processing steps executed in order to accomplish the approaching designated area control A in accordance with the second embodiment of the present invention.

First, the processing steps for executing the approaching designated area control A of step S2300 will be explained using the flowchart of FIG. 20.

In step S2310, the controller 50A determines whether or not to execute virtual speed bump control. If both of the conditions (a) and (b) are satisfied, the controller 50A determines that virtual speed bump control should be executed and proceeds to step S2320. If either one (or both) of the conditions (a) and (b) is not satisfied, the controller 50A ends the control routine (ends the approaching designated area control A).

Figure 21:
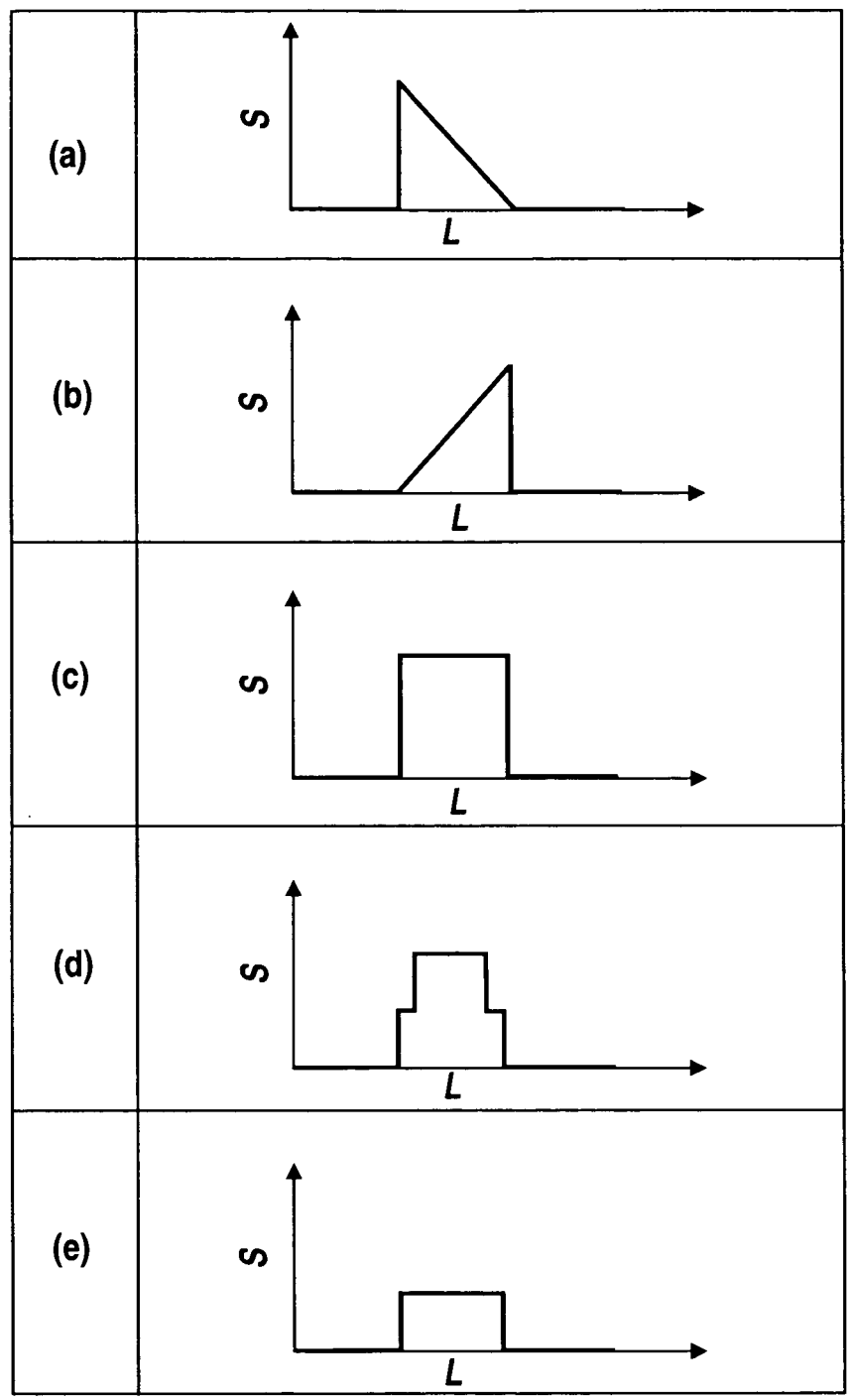
FIG. 21 is a series of graphs showing exemplary shapes of the imaginary speed limiting road protrusions (e.g., imaginary speed bumps) generated by controlling the active suspension in accordance with the second embodiment of the present invention.

In step S2320, the controller 50A determines the size of the imaginary speed limiting road protrusion and selects the suspension stroke control method to be used in order to generate the imaginary speed limiting road protrusion. The size, i.e., the shape, of the imaginary speed limiting road protrusion (e.g., imaginary speed bump) is calculated as a stroke amount S of the hydraulic cylinders 905FR to 905RL that will be used to generate the shock associated with crossing over the imaginary speed limiting road protrusion. FIG. 21 show examples of relationships between the stroke amount S and a distance L. The distance L is, for example, the distance traveled from the point where it was determined to start the approaching designated area control A. In this embodiment, the controller 50A selects one of the imaginary speed limiting road protrusion shapes shown in FIG. 21 and calculates a relationship of the stroke amount S versus the travel distance L to serve as the braking force control amount. The larger the stroke amount S is, the more the hydraulic cylinders 905FR to 905RL elongate and contract.

The time Tn+1 until the next imaginary speed limiting road protrusion is generated and the control delay time Tr between the time when control of the hydraulic cylinders 905FR and 905FL of the front wheels starts and the time when control of the hydraulic cylinders 905RR and 905RL of the rear wheels starts are calculated in the same manner as in the first embodiment.

It is also possible to operate the front hydraulic cylinders 905FR and 905FL and the rear hydraulic cylinders 905RR and 905RL simultaneously in a coordinated manner so as to achieve an even more realistic sensation of the host vehicle traveling over a speed bump. For example, by setting the stroke amounts S such that the stroke amounts S of the front hydraulic cylinders 905FR and 905FL are longer and the stroke amounts of the rear hydraulic cylinders 905RR and 905RL are shorter, the host vehicle can be made to slant in the pitch direction so as to effectively reproduce the sensation that the driver would experience if the host vehicle were riding up the front surface of a speed bump.

After determining the control method for generating the imaginary speed limiting road protrusion, the controller 50A proceeds to step S2330. In step S2330, the controller 50A sends a command to the visual information presenting device 85 instructing the visual information presenting device 85 to present a speed limit display suited to the current vehicle speed Vh of the host vehicle. When the first imaginary speed limiting road protrusion is generated (n=0), the controller 50A sends a command to the audio information presenting device 80 instructing it to generate an alarm sound in two single bursts in order to inform the driver that the specialized area approach control A has started.

In step S2340, the controller 50A issues a command to the active suspension device 90 instructing it to generate stroke amounts S corresponding to the travel distance L calculated in step S1720. The active suspension device 90 controls the excitation currents of the solenoids of the pressure control valves 908FR to 908RL in accordance with signals from the controller 50A, thereby controlling the amount by which each of the hydraulic cylinders 905FR to 905RL elongates or contracts. As a result, the vertical behavior of the host vehicle body is controlled at the front wheels and the rear wheels of the host vehicle independently in such a manner as to mimic the behavior the host vehicle body would exhibit if the host vehicle were passing over a speed bump. When control of the stroke amount S for generating an imaginary speed limiting road protrusion has been executed with respect to the front wheels, the stroke amount control is executed with respect to the rear wheels as well, regardless of the previously described control execution conditions (a) and (b).

In step S2350, the controller 50A issues a command to the accelerator pedal reaction force control device 60 instructing it to add a pulsed supplemental reaction force ΔFp to the accelerator pedal 62 in synchronization with the timing at which the host vehicle passes over the imaginary speed limiting road protrusion. As a result, the accelerator pedal 62 exerts an actuation reaction force equal to the sum of the reaction force control command value FA corresponding to the risk potential RP and the supplemental reaction force ΔFp.

In step S2360, the controller 50A increments a counter that indicates the number of times n the imaginary speed limiting road protrusion has been generated. In step S2370, the controller 50A waits until it is time to generate the next imaginary speed limiting road protrusion, i.e., until the time Tn+1 has elapsed since control of the stroke amounts S of the hydraulic cylinders 905FR and 905FL of the front wheels was started in step S2340 in order to generate the imaginary speed limiting road protrusion. When the time Tn+1 has elapsed, the controller 50A proceeds to step S2380 and determines the number of times n the speed bump has been generated. If the number of times n the imaginary speed limiting road protrusion has been generated is less than 3 (n<3), the controller 50A returns to step S2320 and executes control to generate the next imaginary speed limiting road protrusion. If the number of times n equals 3, the controller 50A ends this control routine (ends the approaching designated area control A).

Figure 22:
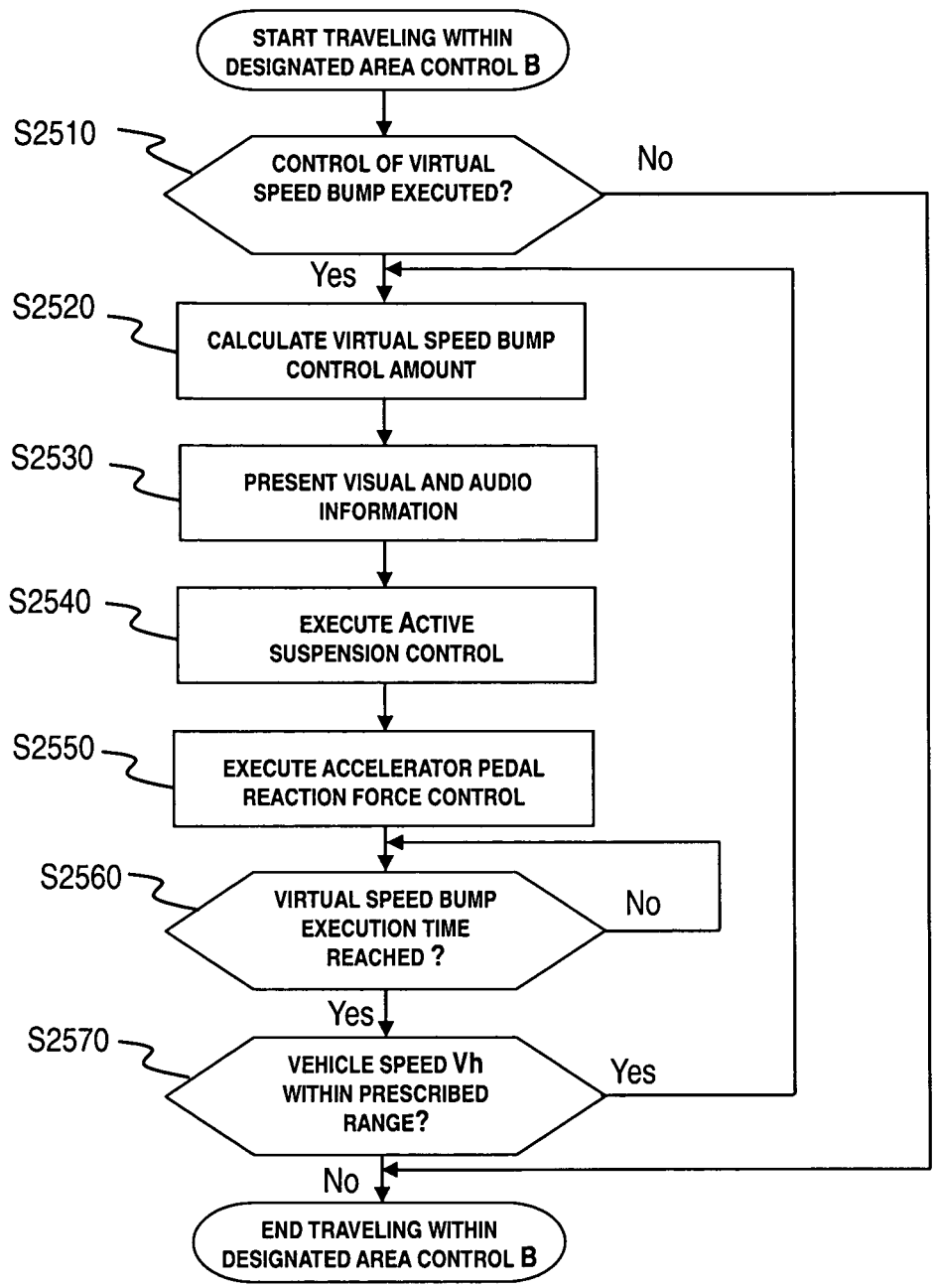
FIG. 22 is a flowchart for explaining the processing steps executed in order to accomplish the traveling within designated area control B in accordance with the second embodiment of the present invention.

Next, the processing steps for executing the traveling within designated area control B of step S2500 will be explained using the flowchart of FIG. 22.

In step S2510, the controller 50A determines whether or not to execute virtual speed bump control. The controller 50A determines that virtual speed bump control should be executed when both of the aforementioned conditions (a) and (b) used for determining if the approaching designated area control A should be executed are satisfied. If either one (or both) of the conditions (a) and (b) is not satisfied, the controller 50A ends this control routine (ends the traveling within designated area control B).

In step S2520, the controller 50A determines the size of the imaginary speed limiting road protrusion and selects the method of controlling the stroke amount S to be used in order to generate the imaginary speed limiting road protrusion. The control method and the shape of the imaginary speed limiting road protrusion are determined using a procedure similar to that used in step S2320 of the approaching designated area control A. For example, in the traveling within designated area control B, the size of each imaginary speed limiting road protrusion can be set smaller, i.e., the sizes of the stroke amounts S shown in FIG. 21 can be set to smaller values, such that the driver can be informed in a continuous manner that the host vehicle is already traveling inside a designated area.

After determining the control method for generating the imaginary speed limiting road protrusion, the controller 50A proceeds to step S2530. In step S2530, as it does in approaching designated area control A, the controller 50A sends a command to the visual information presenting device 85 instructing the visual information presenting device 85 to present a speed limit display suited to the current vehicle speed Vh of the host vehicle. Also, the controller 50A sends a command to the audio information presenting device 80 instructing it to generate a continuous alarm sound while the imaginary speed limiting road protrusions are being generated.

In step S2540, the controller 50A issues a command to the active suspension device 90 instructing it to generate a stroke amount S corresponding to the travel distance L calculated in step S2520. The active suspension device 90 controls the excitation currents of the solenoids of the pressure control valves 908FR to 908RL in accordance with signals from the controller 50A, thereby controlling the amount by which each of the hydraulic cylinders 905FR to 905RL elongates or contracts. As a result, the vertical behavior of the host vehicle body is controlled at the front wheels and the rear wheels of the host vehicle independently in such a manner as to mimic the behavior the host vehicle body would exhibit if the host vehicle were passing over a speed bump When control of the stroke amount S for generating an imaginary speed limiting road protrusion has been executed with respect to the front wheels, the stroke amount control is executed with respect to the rear wheels as well, regardless of the previously described control execution conditions (a) and (b).

In step S2550, the controller 50A issues a command to the accelerator pedal reaction force control device 60 instructing it to add a pulsed supplemental reaction force ΔFp to the accelerator pedal 62 in synchronization with the timing at which the host vehicle passes over the imaginary speed limiting road protrusion.

In step S2560, the controller 50A waits until it is time to generate the next imaginary speed limiting road protrusion, i.e., until the time Tn+1 has elapsed since the control of the stroke amount S of the front wheels was started in order to generate the imaginary speed limiting road protrusion in step S2540. When the time Tn+1 has elapsed, the controller 50A proceeds to step S2570 and determines if the host vehicle speed Vh is within a prescribed range. If the host vehicle speed Vh is within the range V1<Vh<V2 (where, for example, V1=10 km/h and V2=60 km/h), then the controller 50A returns to step S2520 and executes control for generating the next imaginary speed limiting road protrusion. If the host vehicle speed Vh is equal to or below V1 or equal to or above V2, the controller 50A ends this control routine.

Figure 23:
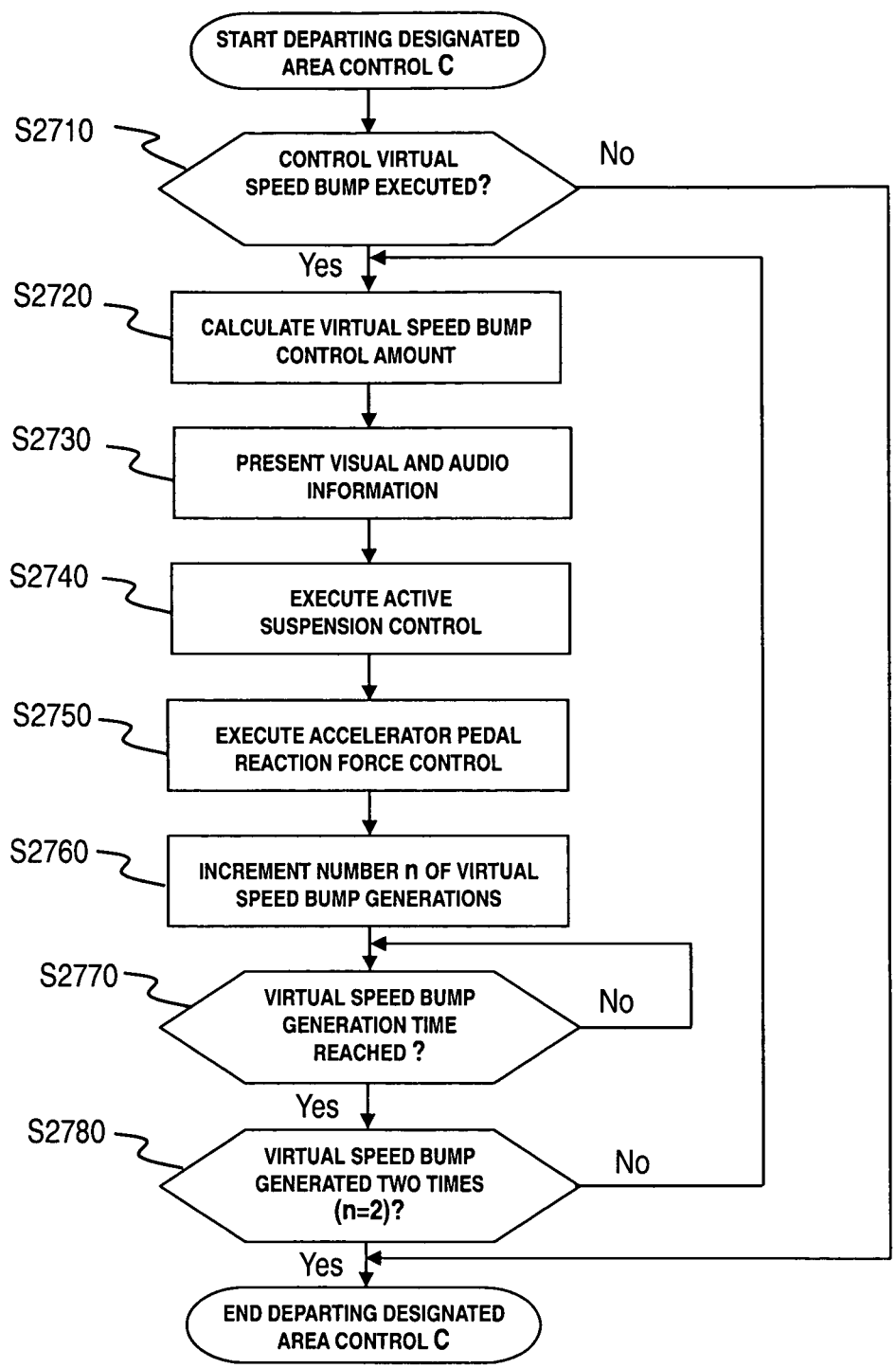
FIG. 23 is a flowchart for explaining the processing steps executed in order to accomplish the departing designated area control C in accordance with the second embodiment of the present invention.

Finally, the processing steps for executing the departing designated area control C of step S2700 will be explained using the flowchart of FIG. 23.

In step S2710, the controller 50A determines whether or not to execute virtual speed bump control. The controller 50A determines that virtual speed bump control should be executed when both of the aforementioned conditions (a) and (b) used for determining if the approaching designated area control A should be executed are satisfied. If either one (or both) of the conditions (a) and (b) is not satisfied, the controller 50A ends this control routine (ends the departing designated area control C). In step S2720, the controller 50A determines the size of the imaginary speed limiting road protrusion and selects the method of controlling the stroke amount S to be used in order to generate the imaginary speed limiting road protrusion. The control method and the shape of the imaginary speed limiting road protrusion are determined using a procedure similar to that used in step S2320 of the approaching designated area control A.

After determining the control method for generating the imaginary speed limiting road protrusion, the controller 50A proceeds to step S2730. In step S2730, as it does in approaching designated area control A, the controller 50A sends a command to the visual information presenting device 85 instructing the visual information presenting device 85 to present a speed limit display suited to the current vehicle speed Vh of the host vehicle. When the first imaginary speed limiting road protrusion is generated (n=0), the controller 50A sends a command to the audio information presenting device 80 instructing it to generate an alarm sound in one single burst in order to inform the driver that the specialized area departure control C has started.

In step S2740, the controller 50A issues a command to the active suspension device 90 instructing it to generate a stroke amount S corresponding to the travel distance L calculated in step S2720. The active suspension device 90 controls the excitation currents of the solenoids of the pressure control valves 908FR to 908RL in accordance with signals from the controller 50A, thereby controlling the amount by which each of the hydraulic cylinders 905FR to 905RL elongates or contracts. As a result, the vertical behavior of the host vehicle body is controlled at the front wheels and the rear wheels of the host vehicle independently in such a manner as to mimic the behavior the host vehicle body would exhibit if the host vehicle were passing over a speed bump. When control of the stroke amount S for generating an imaginary speed limiting road protrusion has been executed with respect to the front wheels, the stroke amount control is executed with respect to the rear wheels as well, regardless of the previously described control execution conditions (a) and (b).

In step S2750, the controller 50A issues a command to the accelerator pedal reaction force control device 60 instructing it to add a pulsed supplemental reaction force ΔFp to the accelerator pedal 62 in synchronization with the timing at which the host vehicle passes over the imaginary speed limiting road protrusion. In step S2760, the controller 50A increments a counter that indicates the number of times n the imaginary speed limiting road protrusion has been generated.

In step S2560, the controller 50A waits until it is time to generate the next imaginary speed limiting road protrusion, i.e., until the time Tn+1 has elapsed since the control of the stroke amount S of the front wheels was started in order to generate the imaginary speed limiting road protrusion in step S2740. When the time Tn+1 has elapsed, the controller 50A proceeds to step S2780 and determines the number of times n the speed bump has been generated. If the number of times n the imaginary speed limiting road protrusion has been generated is less than 2, the controller 50A returns to step S2720 and executes control to generate the next imaginary speed limiting road protrusion. If the number of times n equals 2, the controller 50A ends this control routine (ends the departing designated area control C).

The operational effects of a vehicle driving assist system 2 in accordance with the second embodiment of the present invention will now be explained with reference to the drawings. The control operations that are executed during the specialized area approach control A, the specialized area control B, and the specialized area departure control C are generally the same as the control operations executed in the first embodiment and summarized in FIG. 15.

Figure 24:
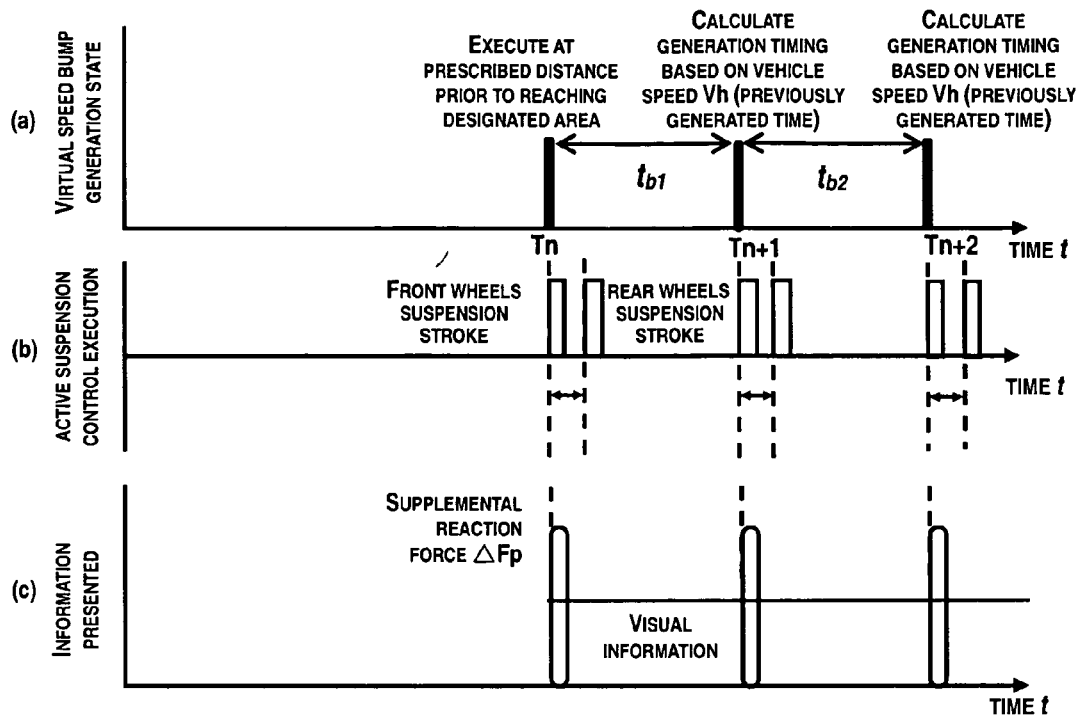
FIG. 24 is a series of graphs showing how the operating state of the imaginary speed limiting road protrusion (e.g., imaginary speed bump) control, the operating state of the active suspension control, and the information presented to the driver change over time.

FIG. 24 show how the imaginary speed limiting road protrusion generation state, the active suspension operating state, and the information presented to the driver change with time during the approaching designated area control A. When the distance Da from the host vehicle to the designated area falls to the prescribed value Dth, the system 2 executes control of the stroke amounts S of the front hydraulic cylinders 905FR and 905FL at a time Tn in order to cause the host vehicle to behave in such a fashion as to give the driver the sensation of deceleration that the driver would feel if the front wheels of the host vehicle were passing over a speed bump, i.e., to behave in such a fashion as to generate an imaginary speed limiting road protrusion with respect to the front wheels. At the same time, the system 2 causes the accelerator pedal 62 to exert a pulsed supplemental reaction force ΔFp. The image dependent on the speed limit and the host vehicle speed Vh is displayed on a display monitor of the visual information presenting device 85. When the control delay time Tr has elapsed, the system 2 executes control of the stroke amounts S of the rear hydraulic cylinders 905RR and 905RL in order to cause the host vehicle to behave in such a fashion as to give the driver the sensation of deceleration that the driver would feel if the rear wheels of the host vehicle were passing over a speed bump, i.e., to behave in such a fashion as to generate an imaginary speed limiting road protrusion with respect to the rear wheels.

At the next execution timing Tn+1 calculated based on the host vehicle speed Vh, the system 2 controls the stroke amounts S of the hydraulic cylinders 905FR and 905FL of the front wheels so as to generate a second imaginary speed limiting road protrusion and executes reaction force control so as to cause the accelerator pedal 62 to exert a pulsed supplementary reaction force ΔFp. Again, when the control delay time Tr elapses, the system 2 controls the stroke amounts S of the hydraulic cylinders 905RR and 905RL of the rear wheels. At the next execution timing Tn+2 calculated based on the host vehicle speed Vh, the system 2 controls the stroke amounts S of the hydraulic cylinders 905FR and 905FL of the front wheels so as to generate a third imaginary speed limiting road protrusion and, then, controls the stroke amounts S of the hydraulic cylinders 905RR and 905RL of the rear wheels. The system 2 also causes accelerator pedal 62 to exert the supplementary force ΔFp.

In addition to the operational effects exhibited by the first embodiment, the second embodiment also achieves the following additional effects.

The controller 50A is configured to generate an imaginary speed limiting road protrusion by controlling the stroke amounts of suspension devices installed on the front wheels and rear wheels of a vehicle independently. More specifically, the vertical behavior of the host vehicle body is controlled at the front wheels and the rear wheels of the host vehicle independently by controlling the amount of elongation or contraction of the front hydraulic cylinders 905FR and 905FL and the rear hydraulic cylinders 905RR and 905RL of the active suspension device 90. As a result, a sensation very much like the sensation experienced when the host vehicle passes over a speed bump can be imparted to the driver and the driver can be urged to slow down in an effective manner. More particularly, since the stroke amounts S of the front hydraulic cylinders 905FR and 905FL and the rear hydraulic cylinders 905RR and 905RL can be controlled separately, the host vehicle behavior exhibited when the front wheels pass over a speed bump and the host vehicle behavior exhibited when the rear wheels pass over a speed bump can be reproduced very accurately and the driver can be urged to slow down in an even more effective manner.

Third Embodiment

A vehicle driving assist system in accordance with a third embodiment of the present invention will now be explained. The basic constituent features of a vehicle driving assist system in accordance with the third embodiment are the same as those of the first embodiment shown in FIGS. 1 and 2. The third embodiment will be explained chiefly by describing its differences with respect to the first embodiment.

Figure 25:
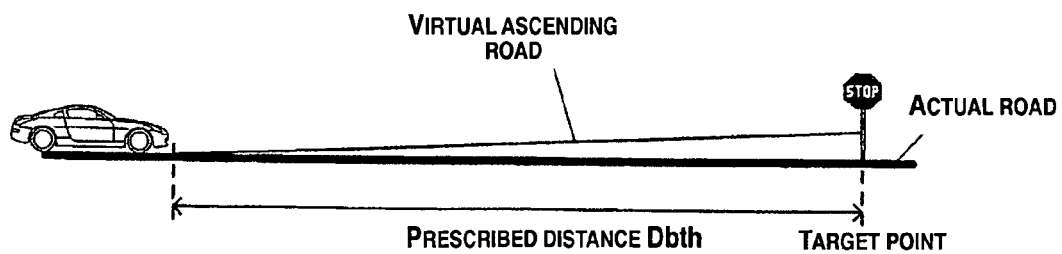
FIG. 25 is diagrammatic view illustrating a virtual speed bump control in accordance with a third embodiment of the present invention.

In the third embodiment, when the host vehicle is traveling in the vicinity of a designated area or inside a designated area, the system executes a virtual speed bump control to cause the host vehicle to decelerate in such a manner as to mimic the behavior the host vehicle would exhibit if it were crossing over a speed bump (i.e., to generate an imaginary speed limiting road protrusion) and a constant deceleration control to cause the host vehicle to decelerate at a constant rate as though it were traveling up an ascending road (slope). As shown in FIG. 25, the constant acceleration control is configured to decelerate the host vehicle at a constant deceleration rate until the host vehicle speed reaches a prescribed speed when a temporary stop point exists ahead along the road on which the host vehicle is traveling. In this way, the constant acceleration control helps the driver reliably decelerate the host vehicle to a stop at the temporary stop point. As shown in FIG. 25, the constant deceleration control causes the host vehicle to decelerate to the temporary stop point in a manner closely resembling the deceleration the host vehicle would exhibit if it were traveling up a slope. This deceleration control is thus called "virtual slope control."

Figure 26:
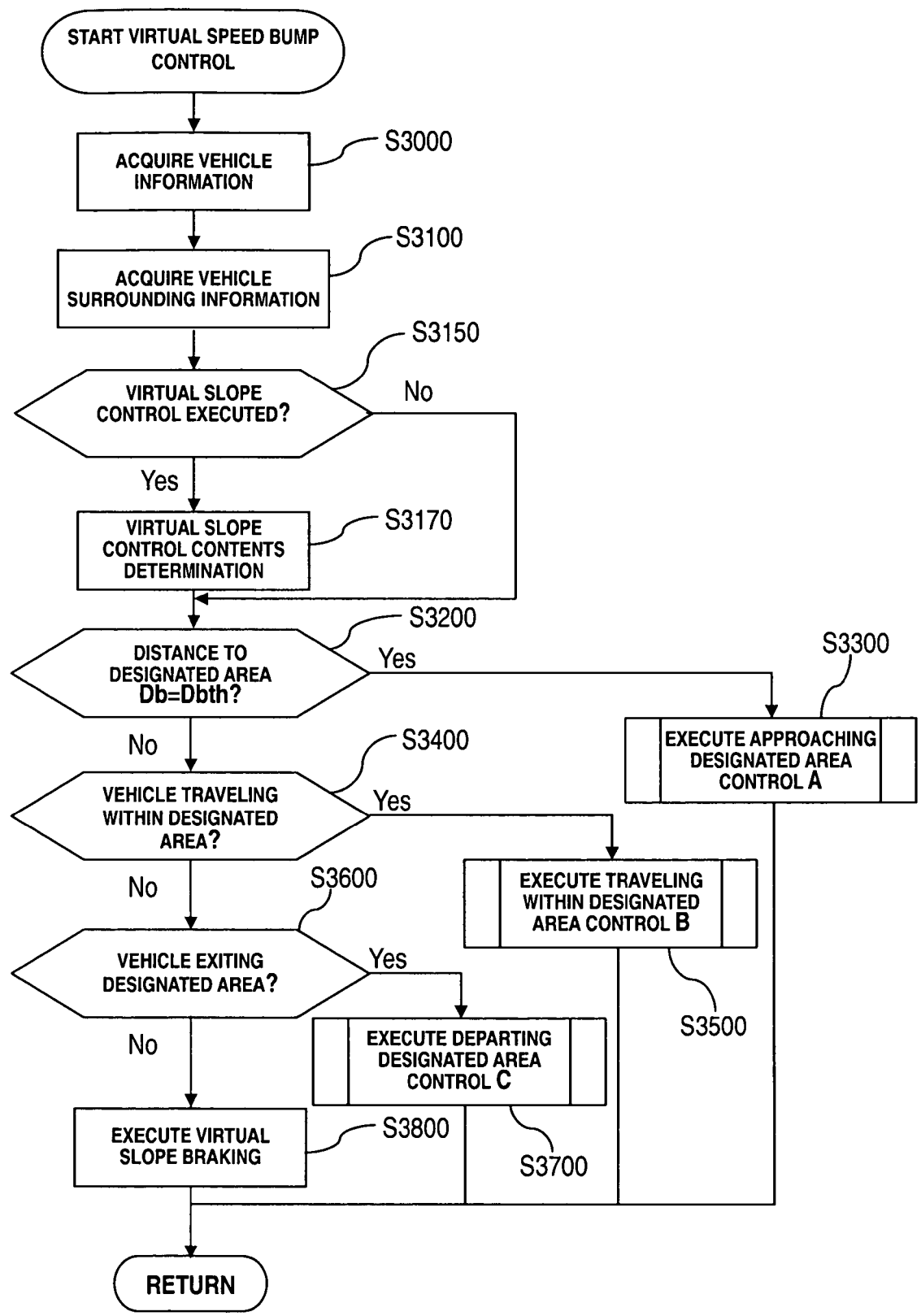
FIG. 26 is a flowchart showing the processing steps of a virtual speed bump control in accordance with the third embodiment of the present invention.

The operation of a vehicle driving assist system in accordance with the third embodiment will now be explained. FIG. 26 is a flowchart showing the processing steps executed in order to accomplish the virtual speed bump control and the virtual slope control. These processing steps are executed in step S160 of the flowchart shown in FIG. 5. In step S3000, the controller 50 acquires vehicle information. The host vehicle information mentioned here is the host vehicle speed Vh detected by the host vehicle speed sensor 30 and the wheel base Lw of the host vehicle stored in a memory of the controller 50.

In step S3100, the controller 50 acquires surroundings information from the navigation system 10. The surroundings information is information related to designated areas existing in front of the host vehicle. The controller 50 also detects if there is a place where the host vehicle will need to stop temporarily (temporary stop point) and detects the slope (grade) of the road on which the host vehicle is traveling. Places where the host vehicle will need to make a temporary stop include such temporary stop points as intersections having a stop sign and places where sudden accidents often occur (e.g., intersections where visibility is poor with respect to cross traffic). Information regarding the road grade and places where the host vehicle will need to stop temporarily is, for example, stored in the map database of the navigation system 10 in advance. Temporary stop points and places where sudden accidents occur will be referred to hereinafter as "virtual slope target points". When a designated area exists in front of the host vehicle, the controller 50 calculates the distance Da from the host vehicle to the designated area. When a virtual slope target point exists in front of the host vehicle, the controller 50 calculates the distance Db from the host vehicle to the virtual slope target point.

In step S3150, the controller 50 determines whether or not to execute virtual slope control. More specifically, the controller 50 compares the distance Db from the host vehicle to the virtual slope target point to a prescribed value Dbth. The prescribed distance Dbth set to an appropriate distance (e.g., 100 m) for decelerating the host vehicle as though it were traveling up a gentle slope to the virtual slope target point.

If the distance Db has decreased to the prescribed distance Dbth, the controller 50 determines that virtual slope control should be executed and proceeds to step S3170. If the distance Db is larger than or smaller than the prescribed distance Dbth, the controller 50 determines that virtual slope control should not be executed and proceeds to step S3200. Thus, if a virtual slope target point exists in front of the host vehicle along the direction in which the host vehicle is traveling and the distance Db has become equal to Dbth such that the controller 50 has determined that virtual slope control should be executed, then virtual slope control is executed continuously until the host vehicle reaches the virtual slope target point.

Figure 27:
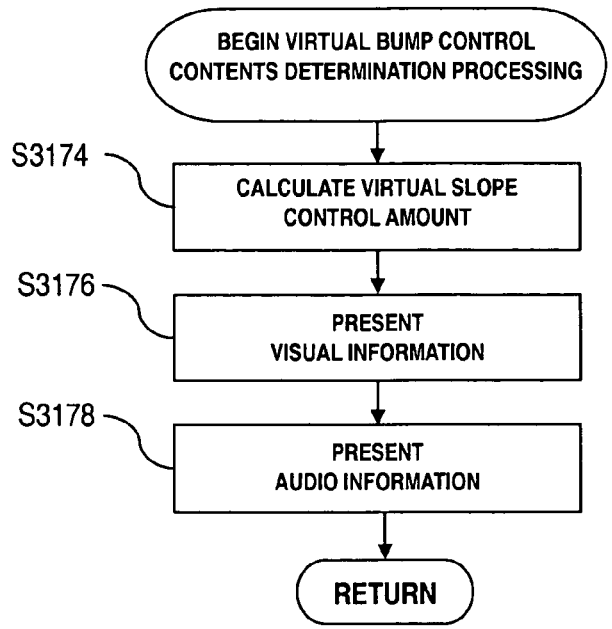
FIG. 27 is a flowchart for explaining the processing steps executed in order to determine the details of the virtual slope control in accordance with the third embodiment of the present invention.

In step S3170, the controller 50 determines the control details of the virtual slope control. The control processing executed in order to accomplish complete step S3170 will now be explained with reference to the flowchart of FIG. 27. In step S3174, the controller 50 calculates a control amount for the virtual slope control. More specifically, the controller 50 calculates the deceleration Dv (hereinafter called "control deceleration") that the host vehicle needs to undergo in order to artificially reproduce the behavior the host vehicle would exhibit if it were traveling up a slope, i.e., in order to generate an imaginary (or "virtual") slope.

The control deceleration Dv corresponds to the slope (grade) of the virtual slope and is set to a fixed value such that the host vehicle will decelerate to a prescribed speed Vd by the time it travels from its current position (i.e., Db=Dbth) to a position located a prescribed distance Dbth0 (e.g., 10 m) in front of the virtual slope target point. The control deceleration Dv can be calculated Equation 6 below.

$$Dv=(Vh^2-Vd^2)/2/(Dbth-Dbth0) \quad \text{(Equation 6)}$$

The prescribed speed Vd is set to a value corresponding to a slow traveling speed, e.g., Vd=10 km/h.

The control deceleration Dv is fixed at the value calculated with Equation 6 at the point in time when the controller 50 determined that it would execute virtual slope control in step S3150. In other words, the host vehicle is made to decelerate at a constant deceleration rate Dv, i.e., travel up an imaginary slope, until it reaches a prescribed distance Dbth0 from the target point. However, if the driver operates the brake pedal in such a fashion as to cause the host vehicle to decelerate at a deceleration rate that is larger than the control deceleration Dv, then the deceleration induced by the driver is given priority and the control deceleration Dv is set to 0.

Figure 28:
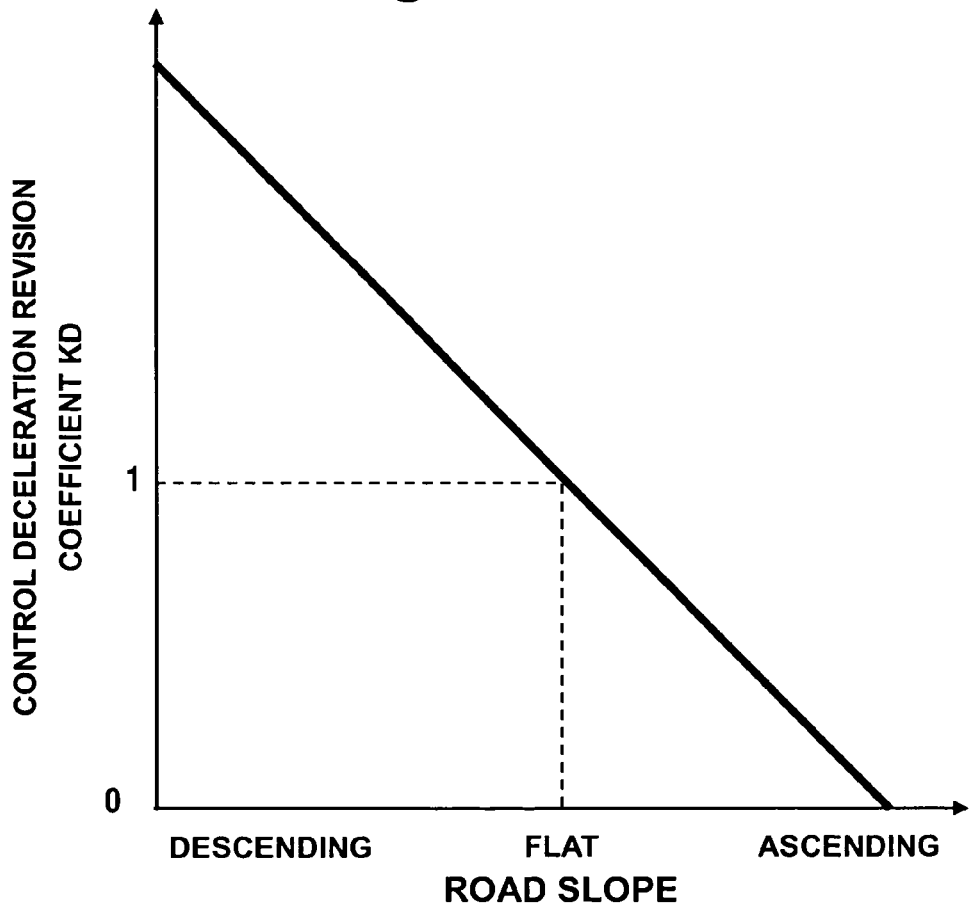
FIG. 28 is a graph of the control deceleration revision coefficient versus the road slope (grade)

The control deceleration Dv is revised based on the slope (grade) of the road between the host vehicle and the virtual slope target point. FIG. 28 is a table showing a plot of the revision coefficient Kd used to revise the control deceleration Dv versus the road grade. If the road grade is 0%, i.e., if the road is flat, the revision coefficient is set to 1. Since the deceleration caused by the slope of the road increases as the road grade increases, the revision coefficient Kd is decreased gradually from 1 as the road grade increases, thereby revising the control deceleration Dv to a smaller value. Since the deceleration caused by the slope of the road increases as the road grade increases, the revision coefficient Kd is decreased gradually from 1 as the road grade increases, thereby revising the control deceleration Dv to a smaller value. The revised control deceleration Dvc is expressed with the Equation 7 below.

$$Dvc=Kd \times Dv \quad \text{(Equation 7)}$$

In step S3176, the controller 50 presents visual information to the driver to inform the driver that virtual slope control is being executed. For example, the controller 50 causes a notification lamp to be illuminated on the display monitor of the visual information presenting device 85. In step S3178, the controller 50 presents audio information to the driver informing the driver that virtual slope control is being executed. For example, the controller 50 causes the audio information presenting device 80 to emit an alarm sound.

Figure 29:
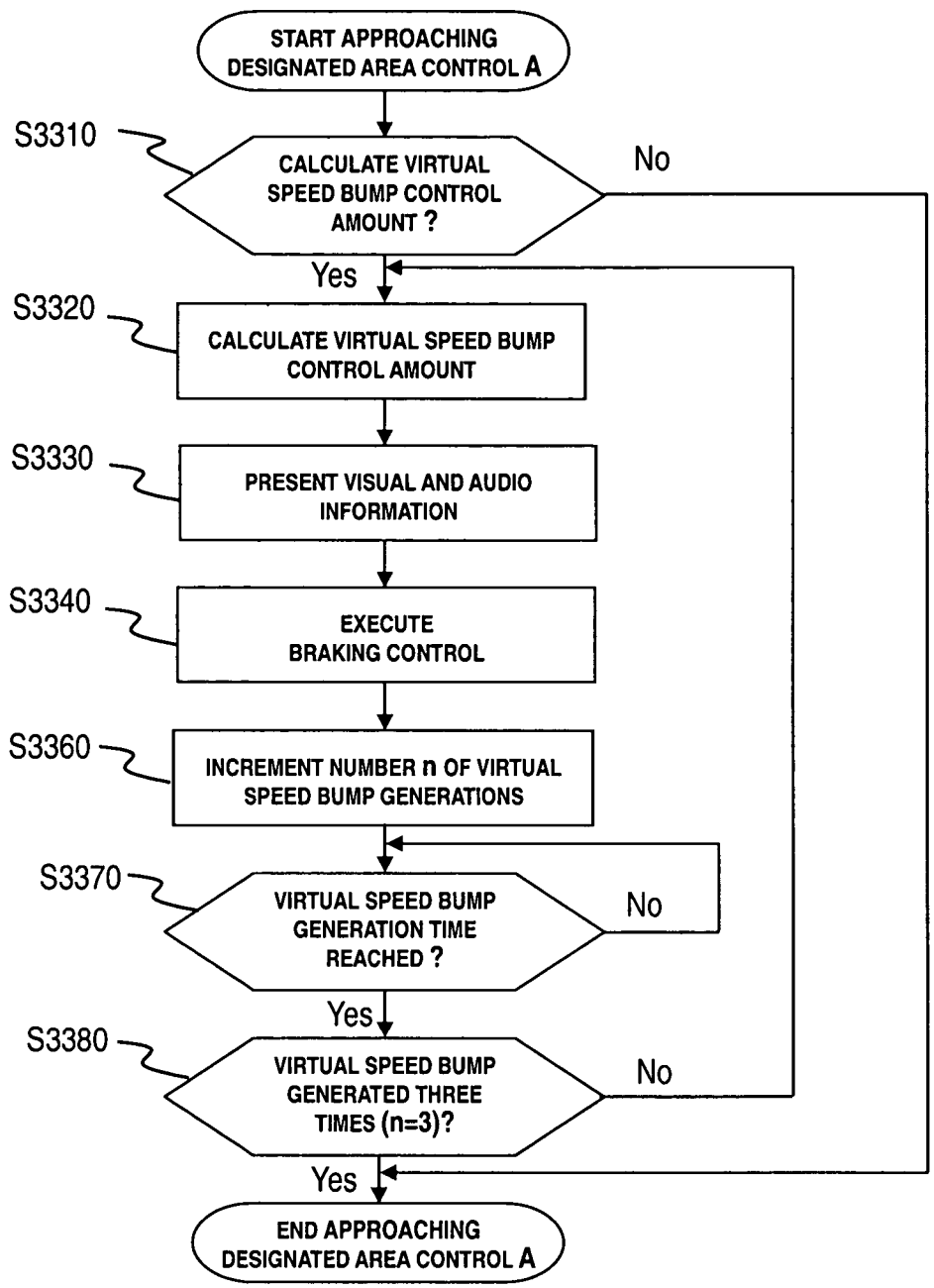
FIG. 29 is a flowchart for explaining the processing steps executed in order to accomplish the approaching designated area control A in accordance with the third embodiment of the present invention.

After calculating the control deceleration Dvc of the virtual slope control and presenting information to the driver, the controller 50 proceeds to step S3200. In step S3200, the controller 50 determines if the distance Da from the host vehicle to a designated area is equal to a prescribed distance Dbth. If so, the controller 50 proceeds to step S3300 and executes the approaching designated area control A. The processing steps of the approaching designated area control A are shown in the flowchart of FIG. 29.

In step S3310, the controller 50 determines if virtual speed bump control should be executed. If so (Yes), the controller 50 proceeds to step S3320 and determines the control amount and the control method for the virtual speed bump control. In this embodiment, an acceleration due to gravity g corresponding to the travel distance L is calculated as a braking force control amount in the same manner as is done in the first embodiment. If virtual slope control is being executed, the size of the imaginary speed limiting road protrusion, i.e., the magnitude of the acceleration due to gravity g, is changed in accordance with the state of a driving operation performed by the driver.

More specifically, if the driver is not depressing the accelerator pedal 62 while virtual slope control is being executed, the controller 50 revises the size of the imaginary speed limiting road protrusion to a smaller size. In other words, since the driver has released the accelerator pedal 62 and does not intend to accelerate, it is not necessary to generate an imaginary speed limiting road protrusion and urge the driver to decelerate the host vehicle because the host vehicle is already being decelerated at a constant rate by the virtual slope control. Meanwhile, if the driver is operating the accelerator pedal 62, the controller 50 does not revise the size of the imaginary speed limiting road protrusion.

In step S3330, the controller 50 presents a speed limit display suited to the current vehicle speed Vh of the host vehicle and generates an alarm sound. In step S3340, the controller 50 issues a command to the brake control device 70 instructing it to generate a braking force control amount corresponding to the travel distance L calculated in step S3320 and to decelerate the host vehicle at a rate equal to the control deceleration Dvc calculated in step 3170. The brake control device 70 controls the brake fluid pressure supplied to the wheel cylinders 705FR to 705RL of the wheels in accordance with the signal from the controller 50. As a result, when virtual speed bump control and virtual slope control are executed simultaneously, the system causes the host vehicle to decelerate in a manner similar to the way the host vehicle would decelerate if it were passing over a speed bump installed on an inclined road surface.

Figure 9:
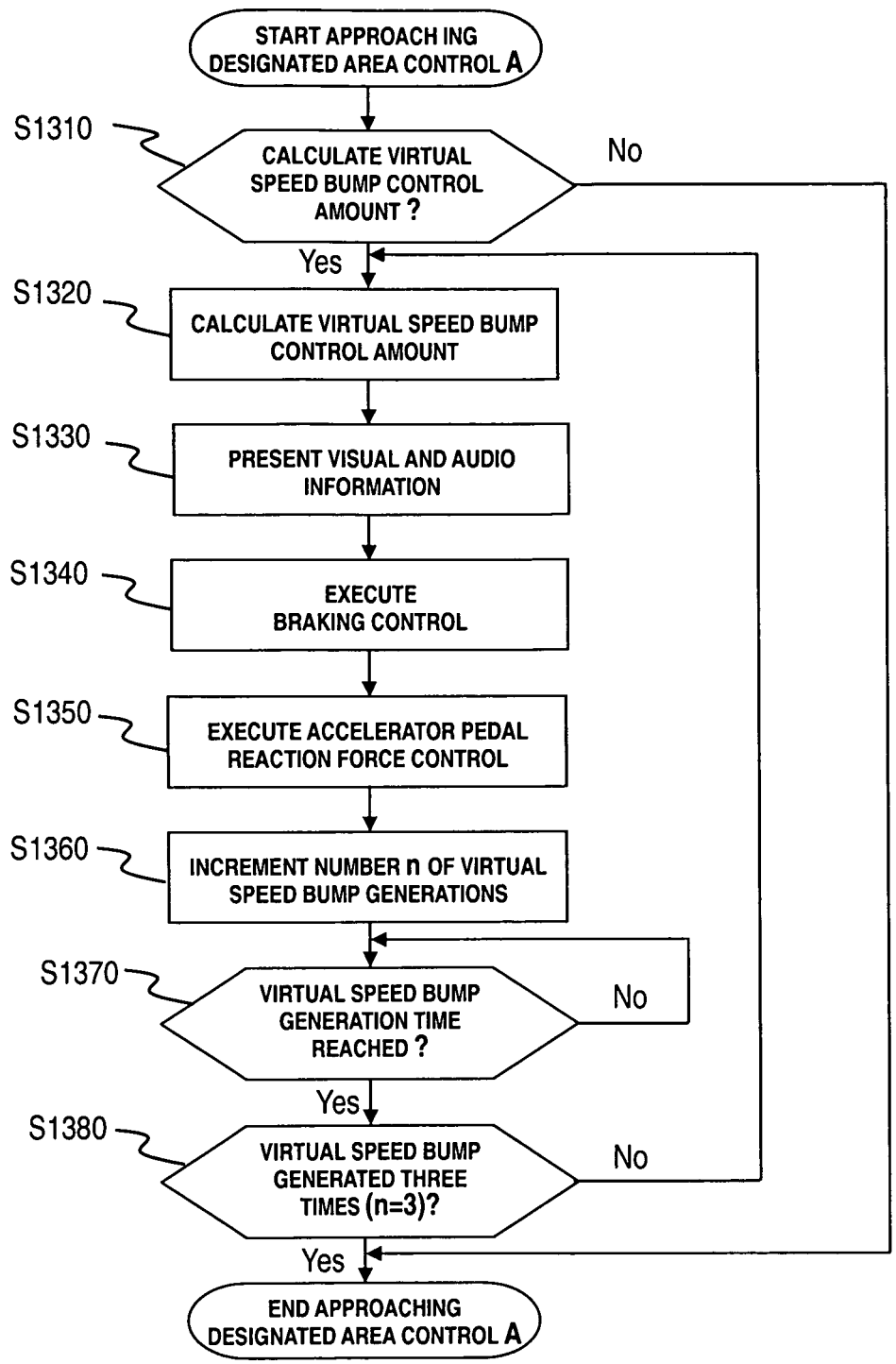
FIG. 9 is a flowchart for explaining the processing steps executed in order to accomplish the approaching designated area control A.

The control processing executed in steps S3360 to S3380 is the same as the control processing executed in steps S1360 to S1380 of FIG. 9. Also, the processing corresponding to step S1350 of FIG. 9 has been omitted and a supplemental reaction force ΔFp is not generated in the accelerator pedal 62.

Figure 30:
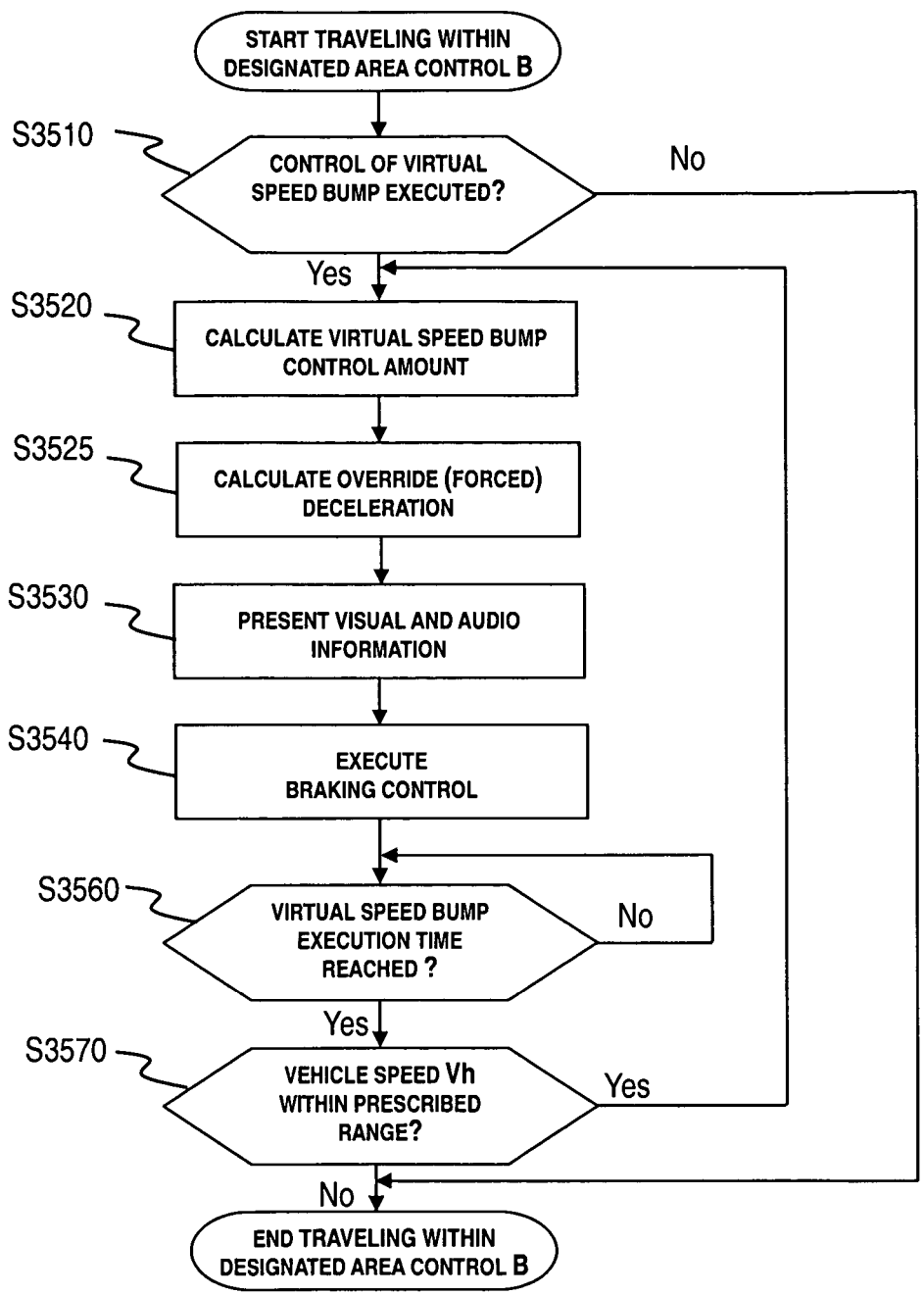
FIG. 30 is a flowchart for explaining the processing steps executed in order to accomplish the traveling within designated area control B in accordance with the third embodiment of the present invention.

In step S3400 of FIG. 26, the controller 50 determines if the host vehicle is traveling inside a designated area. If so (Yes), the controller proceeds to step S3500 and executes the traveling within designated area control B. The processing steps for executing the traveling within designated area control B will now be explained using the flowchart of FIG. 30.

In step S3510, the controller 50 determines if virtual speed bump control should be executed. If so (Yes), the controller proceeds to step S3520 and determines the control amount and the control method for executing the virtual speed bump control in the same manner as in the approaching designated area control A. In step S3525, the controller 50 calculates an override or forced deceleration rate Dg at which the host vehicle will be forced to decelerate if the host vehicle does not decelerate after imaginary speed limiting road protrusions (e.g., imaginary speed limiting road protrusions) have been generated continuously for a prescribed period of time by the traveling within designated area control B.

More specifically, the controller 50 compares a preset recommended speed Vg to the host vehicle speed Vh detected after a prescribed amount of time has elapsed since the traveling within designated area control B started. If the host vehicle speed Vh is larger than the recommend speed Vg, the controller calculates an overriding deceleration Dg to forcefully decelerate the host vehicle. The recommended speed Vg is set to an appropriate speed for traveling inside the designated area. For example, the recommended speed Vg is set in advance to an appropriate value based on the speed limit. The override deceleration Dg is set to, for example, 2 m/s². The override deceleration Dg is imposed until the host vehicle speed Vh decreases to the recommended speed Vg.

In step S3530, the controller 50 presents a speed limit display suited to the current vehicle speed Vh. While it decelerates the host vehicle at the override deceleration Dg, the controller 50 causes the audio information presenting device 80 to emit a continuous warning sound. The warning sound emitted here preferably has a larger volume than the alarm sound emitted in, for example, the approaching designated area control A so as to reliably alert the driver to use caution. In step S3540, the controller 50 issues a command to the brake control device 70 instructing it to generate a braking force control amount corresponding to the travel distance L calculated in step S3520 and to decelerate the host vehicle at a rate equal to the control deceleration Dvc calculated in step 3170. If an override deceleration Dg was calculated in step S3525, the controller sends a command to the brake control device 70 instructing it to decelerate the host vehicle at the override deceleration Dg until the host vehicle speed Vh falls below the recommended speed Vg. The brake control device 70 controls the brake fluid pressure supplied to the wheel cylinders 705FR to 705RL of the wheels in accordance with the signal from the controller 50.

Figure 13:
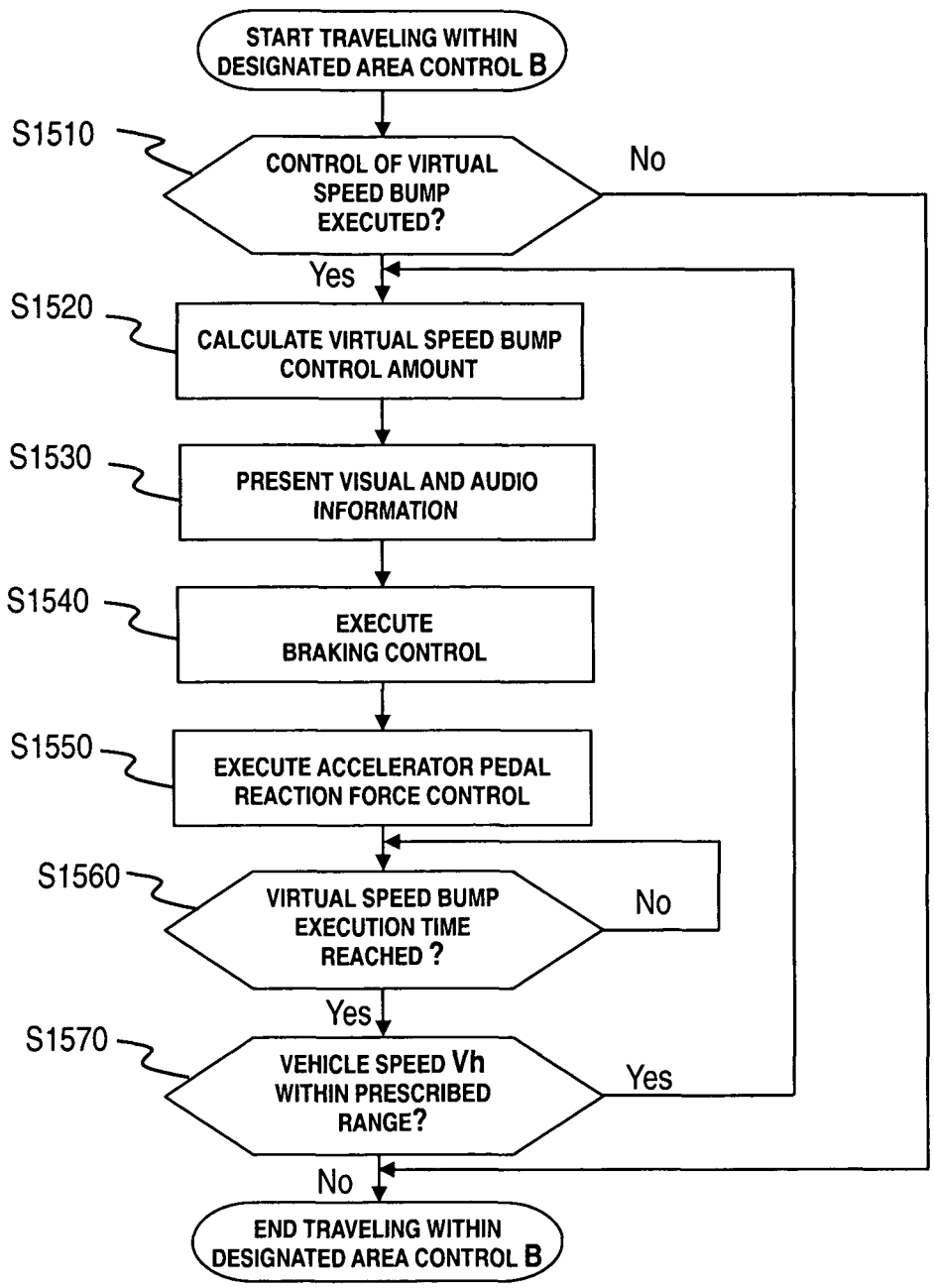
FIG. 13 is a flowchart for explaining the processing steps executed in order to accomplish the traveling within designated area control B.

The control processing executed in steps S3560 to S3570 is the same as the control processing executed in steps S1560 to S1570 of FIG. 13. Also, the processing corresponding to step S1550 of FIG. 13 has been omitted and a supplemental reaction force ΔFp is not generated in the accelerator pedal 62.

Figure 31:
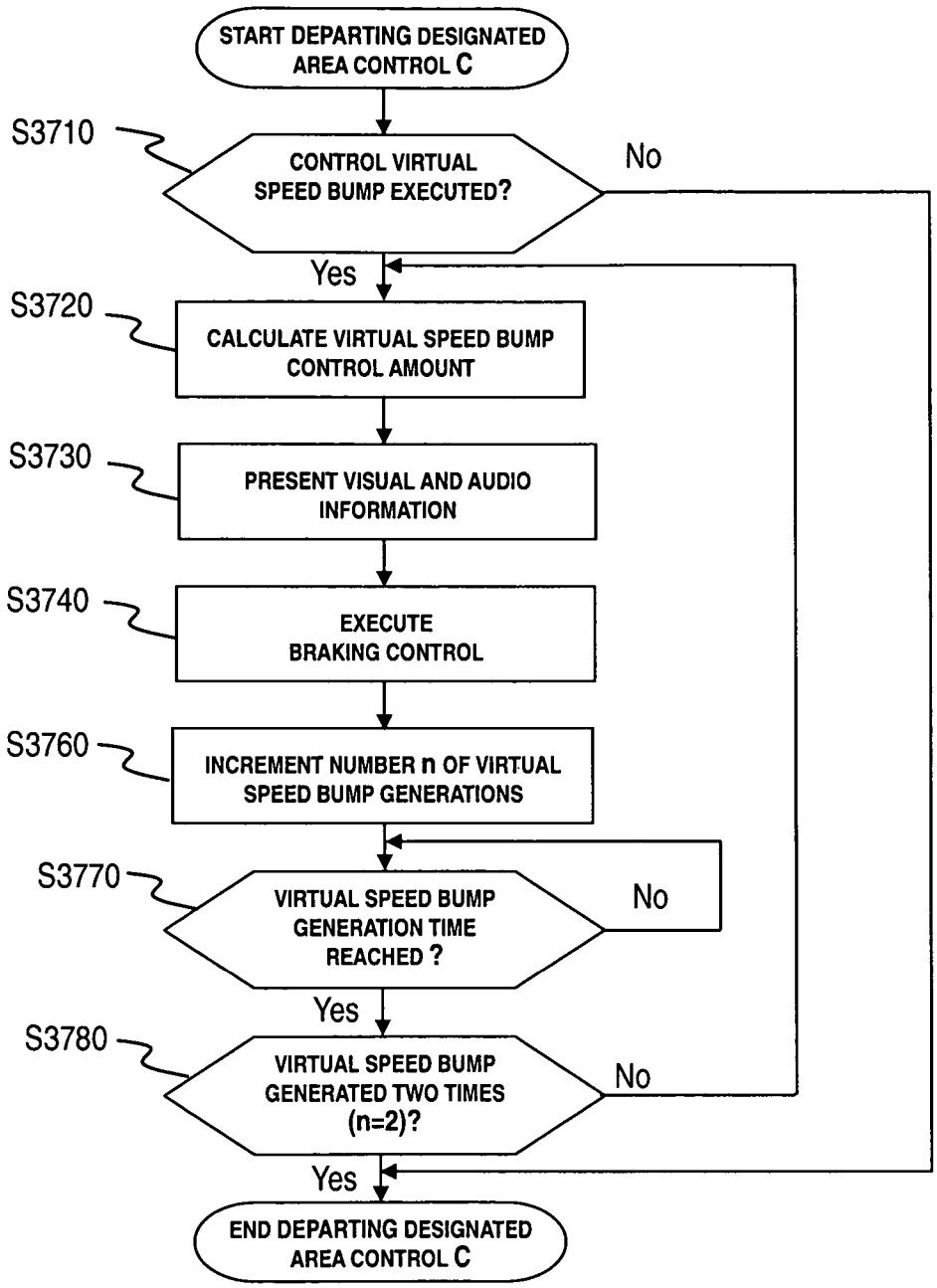
FIG. 31 is a flowchart for explaining the processing steps executed in order to accomplish the departing designated area control C in accordance with the third embodiment of the present invention.

In step S3600 of FIG. 26, the controller 50 determines if the host vehicle is has departed a designated area. If so (Yes), the controller proceeds to step S3700 and executes the departing designated area control C. The processing steps for executing the departing designated area control C will now be explained using the flowchart of FIG. 31.

In step S3710, the controller 50 determines if virtual speed bump control should be executed. If so (Yes), the controller proceeds to step S3720 and determines the control amount and the control method for the virtual speed bump control. In this control C, an acceleration due to gravity g corresponding to the travel distance L is calculated as a braking force control amount in the same manner as is done in the designated area control A. In step S3730, the controller 50 presents a speed limit display suited to the current vehicle speed Vh of the host vehicle and generates an alarm sound. In step S3740, the controller 50 issues a command to the brake control device 70 instructing it to generate a braking force control amount corresponding to the travel distance L calculated in step S3720 and to decelerate the host vehicle at a rate equal to the control deceleration Dvc calculated in step 3170.

Figure 14:
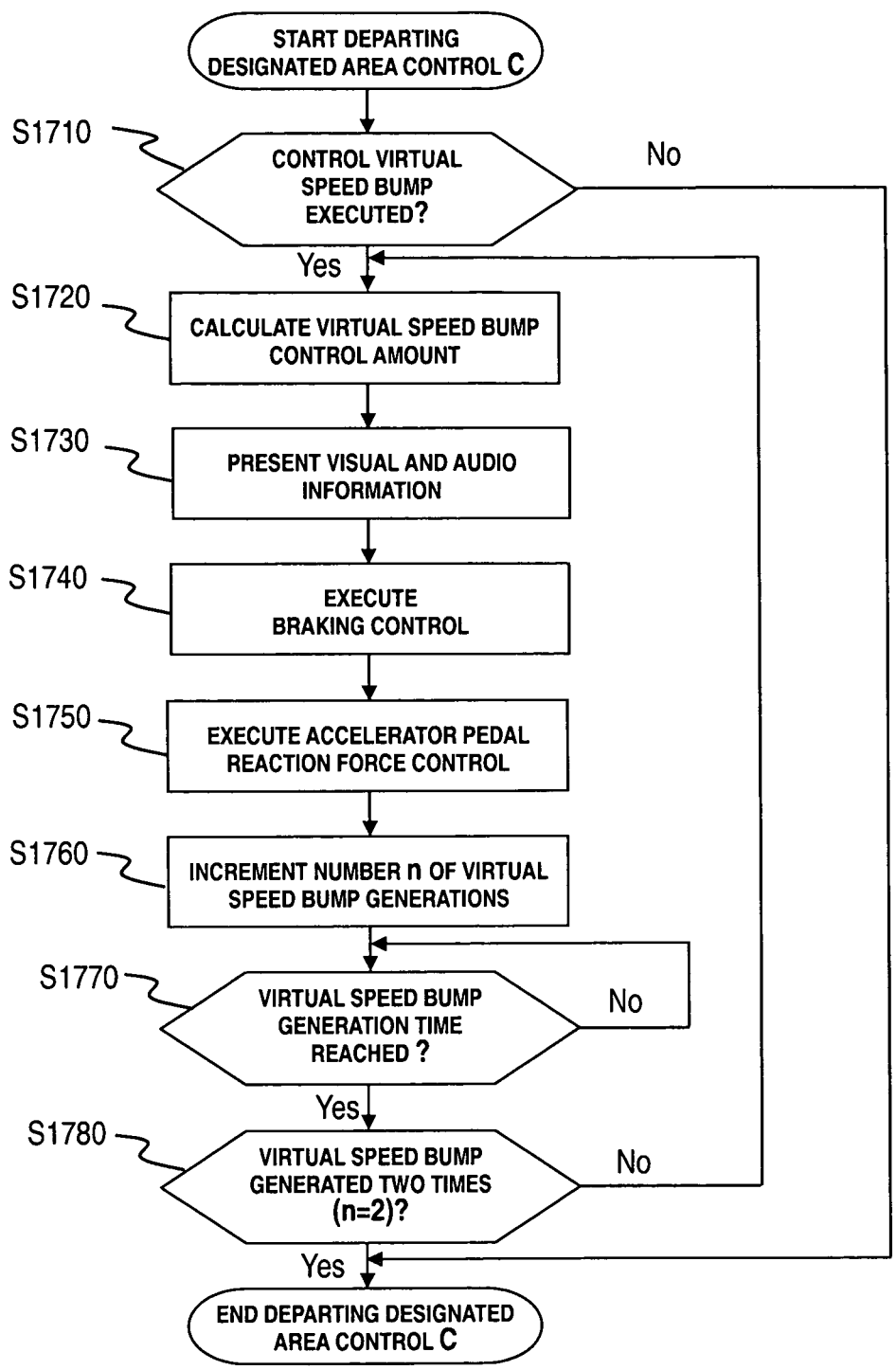
FIG. 14 is a flowchart for explaining the processing steps executed in order to accomplish the departing designated area control C.

The control processing executed in steps S3760 to S3780 is the same as the control processing executed in steps S1760 to S1780 of FIG. 14. Also, the processing corresponding to step S1750 of FIG. 14 has been omitted and a supplemental reaction force ΔFp is not generated in the accelerator pedal 62.

If the result of step S3600 is negative and virtual speed bump control will not be executed, the controller 50 proceeds to step S3800 and instructs the brake control device 70 to decelerate the host vehicle at the control deceleration Dvc calculated in step S3170. In accordance with the command from the controller 50, the brake control device 70 causes the host vehicle to decelerate artificially in a manner that resembles the manner in which the host vehicle would decelerate if it were traveling up an incline. In other words, brake control device executes virtual slope control so as to generate the imaginary slope. After the command values are sent, the current control loop ends.

In addition to the operational effects exhibited by the first embodiment, the third embodiment also achieves the following additional effects.

The controller 50 of the vehicle driving assist system 1 of this third embodiment is configured to include a temporary stop point detecting section or device that detects a point (position) in front of the host vehicle where it will be necessary for the host vehicle to stop temporarily, and an imaginary ascending road deceleration control section or device) that sets an imaginary ascending road that extends from the host vehicle to a detected temporary stop point and decelerate the host vehicle at a deceleration rate that resembles the deceleration the host vehicle would exhibit if it were traveling up the imaginary ascending road (slope). More specifically, the system calculates a control deceleration Dv corresponding to the slope (grade) of the imaginary ascending road and decelerates the host vehicle at a constant deceleration Dv until the host vehicle reaches the temporary stop point. As a result, it is easier to stop the host vehicle at the point where it is necessary to stop the host vehicle temporarily. Since the system causes the host vehicle to decelerate in a manner that closely resembles the manner in which the host vehicle would decelerate if it were climbing a hill having a constant slope (grade), the deceleration control is less likely to cause the driver to think there is something odd about the host vehicle behavior.

The controller 50 of the vehicle driving assist system 1 of this third embodiment is further configured to include a slope detecting section or device that detects the slope (grade) of a road on which the host vehicle is traveling and adjusts the control deceleration in accordance with the detected slope of the road. More specifically, as shown in FIG. 28, the system sets a revision coefficient Kd such that the value of the revision coefficient Kd decreases from 1 as the ascending slope of the road increases from a flat road surface and increases from 1 as the descending slope of the road increases from a flat road surface. The system 1 then revises the control speed Dv using the revision coefficient Kd. As a result, when the actual road is inclined or declined, an appropriate control deceleration Dvc can be set based on the grade of the road and the temporary stop of the host vehicle can be accomplished more easily.

The controller 50 of the vehicle driving assist system 1 of this third embodiment is further configured to include an automatic brake control section or device that executes automatic braking control so as to decelerate the host vehicle to a prescribed speed when the host vehicle is traveling inside a designated area and imaginary speed limiting road protrusions have been generated continuously for a prescribed amount of time. More specifically, when a prescribed amount of time has elapsed since the traveling within designated area control B was started, the host vehicle speed Vh is compared to a recommended speed Vg. If the host vehicle speed Vh is larger than the recommended speed Vg, the system 1 decelerates the host vehicle at an override deceleration rate Dg until the host vehicle speed Vh falls to the recommended speed Vg. As a result, the host vehicle can be forced to decelerate automatically in situations where the generation of imaginary speed limiting road protrusions fails to cause the driver to decelerate the host vehicle when traveling inside a designated area where it is necessary to slow down.

The controller 50 of the vehicle driving assist system 1 of this third embodiment is further configured to include an alarm generating section or device that emits a continuous warning signal (sound and/or image) when the host vehicle is traveling inside a designated area and imaginary speed limiting road protrusions have been generated continuously for a prescribed amount of time. More specifically, while the host vehicle is being decelerated at the override deceleration Dg, the audio information presenting device 80 emits a continuous warning sound and displays a speed image. As a result, the driver can be alerted to the necessity of decelerating the host vehicle immediately while the host vehicle is being decelerated at the override deceleration rate Dg.

It is possible to combine the third embodiment and the second embodiment together. In other words, the vehicle driving assist system can be provided with both the active suspension device 90 and the brake control device 80 and configured to execute virtual speed bump control with the active suspension device 90 and virtual slope control with the brake control device 80.

In the first to third embodiments, the virtual speed bump control and the virtual slope control are executed in systems that are configured to control the reaction force of the accelerator pedal based on a risk potential RP. However, the invention is not limited to such an arrangement; it is possible to configure a system in which virtual speed bump control and virtual slope control are executed and accelerator pedal reaction force control is not executed. It is also possible to configure a system in which the accelerator pedal 62 is not made to exert a supplemental force ΔFp when an imaginary speed limiting road protrusion is being generated. It is also possible to use the brake pedal 71 instead of the accelerator pedal 62 as the driver-operated device to which the reaction force control is applied and control the actuation reaction force of the brake pedal 71 in accordance with the risk potential RP. Still another option is to configure the system to execute a combination of accelerator pedal reaction force control and brake pedal reaction force control.

In the first to third embodiments, the system is configured to execute a combination of the approaching designated area control A, the traveling within designated area control B, and the departing designated area control C. However, the invention is not limited to such a control scheme. So long as the control scheme is contrived such that an imaginary speed limiting road protrusion is generated to urge the driver to slow down when the host vehicle is entering a designated area where it is necessary to slow down, it is acceptable to omit the departing designated area control C. Although the traveling within designated area control B is contrived to generate imaginary speed limiting road protrusions continuously when the host vehicle speed Vh is within a prescribed range (V1<Vh<V2), the invention is not limited to such a control scheme and it is possible to configured the traveling within designated area control B to generate imaginary speed limiting road protrusions only when the host vehicle speed Vh is larger than the speed limit or a recommended speed Vg. Therefore, in the traveling within designated area control B, it is possible to use a prescribed value V1 set based on the speed limit or the recommended speed Vg in order to set a prescribed range for determining if virtual speed bump control should be executed.

In the first and third embodiments, the imaginary speed limiting road protrusion is generated by controlling the braking forces of the front and rear (left and right) wheels independently and in the second embodiment the imaginary speed limiting road protrusion is generated by controlling the stroke amounts of the active suspension of the front and rear (left and right) wheels independently. However, so long as the impact that the host vehicle would experience if it crossed over a speed bump can be reproduced artificially, the constituent features of the brake control device 70 and the active suspension device 90 are not limited to those described in the previous embodiments. The shapes of the imaginary speed limiting road protrusions and the number of times they are generated are not limited to those described in the first to third embodiments. The shape and number of the imaginary speed limiting road protrusions can be changed so long as the driver is urged to slow down in an effective manner.

In the first to third embodiments, the navigation system 10, the laser radar 20 and the vehicle speed sensor 30 function as a traveling situation detecting section or component, each of the controllers 50 and 50A functions as the risk potential calculating section or component, each of the controllers 50 and 50A and the accelerator pedal reaction force control device 60 function as the actuation reaction force control section or component, and each of the controllers 50 and 50A, the brake control device 70, the active suspension device 90 function as the imaginary speed limiting road protrusion generating section or component. Additionally, the navigation system 10 functions as the designated area detecting section or component, as the temporary stop point detecting section or component, and as the slope detecting section or component. The visual information presenting device 85 functions as the visual information imparting section or component and as the warning generating section or component. The audio information presenting device 80 functions as the audio information imparting section or component and as the warning generating section or component. The controller 50 and the brake control device 70 function as the imaginary ascending road deceleration control section or component and the automatic brake control section or component. However, the invention is not limited to using these particular devices to serve as the sections or components mentioned above. For example, instead of a laser radar 20, a milliwave radar of a different format can be used as the traveling situation detecting section or component. The explanations presented above are merely examples. When interpreting the present invention, the invention should not be limited or restrained in any way by the corresponding relationships between the embodiments and the claims.

What is claimed is:

1. A vehicle driving assist system comprising:
    a traveling situation detecting section configured to detect a host vehicle traveling speed and a different traveling condition indicative of the host vehicle approaching a designated area; and
    an imaginary speed bump generating section configured to selectively generate an imaginary speed bump by artificially reproducing a vehicle behavior in the host vehicle that simulates the host vehicle crossing an actual speed bump arranged on a road surface to alert a driver of the host vehicle that the host vehicle is approaching the designated area and to urge the driver to decelerate the host vehicle, based on the traveling condition being detected by the traveling situation detecting section that the host vehicle is approaching the designated area and the host vehicle traveling speed being detected as higher than a first prescribed speed,
    the imaginary speed bump generating section being configured to selectively generate the imaginary speed bump by supplying brake fluid pressure to each of right, left, front, and rear wheels of the host vehicle within a single generation of the imaginary speed bump to simulate the actual speed bump across an entire wheel width of the host vehicle,
    the imaginary speed bump generating section being further configured to prevent generation of the imaginary speed bump when the host vehicle is traveling at a speed that exceeds a second prescribed speed that is higher than the first prescribed speed.

2. The vehicle driving assist system as recited in claim 1, further comprising
    a designated area detecting section configured to detect the designated area,
    the imaginary speed bump generating section being configured to generate the imaginary speed bump to inform an occupant of the host vehicle when the host vehicle is traveling inside the designated area.

3. The vehicle driving assist system as recited in claim 2, wherein
    the imaginary speed bump generating section is configured to generate the imaginary speed bump differently depending on whether the host vehicle is approaching the designated area but has not yet entered the designated area, whether the host vehicle is traveling inside the designated area, or whether the host vehicle is departing the designated area.

4. The vehicle driving assist system as recited in claim 3, wherein
    the imaginary speed bump generating section is configured to generate the imaginary speed bump when a positional distance between the host vehicle and the designated area has decreased to a prescribed distance.

5. The vehicle driving assist system as recited in claim 2, wherein
    the designated area detecting section is configured to detect at least one of school zones, residential areas, areas surrounding nursing home facilities, and areas surrounding day care facilities as a type of the designated area.

6. The vehicle driving assist system as recited in claim 5, wherein
    the imaginary speed bump generating section is configured to limit generation of the imaginary speed bump to a prescribed range of times of day depending on the type of the designated area being detected.

7. The vehicle driving assist system as recited in claim 2, further comprising
    an automatic brake control section configured to execute braking control automatically such that the host vehicle decelerates to a prescribed speed when the host vehicle is traveling inside the designated area, and when the imaginary speed bump generating section has generated the imaginary speed bump continuously for a prescribed amount of time.

8. The vehicle driving assist system as recited in claim 2, further comprising
    a warning generating section configured to generate a continuous warning signal when the host vehicle is traveling inside the designated area, with the imaginary speed bump generating section being further configured to generate the imaginary speed bump continuously for a prescribed amount of time.

9. The vehicle driving assist system as recited in claim 1, wherein
    the imaginary speed bump generating section is configured to generate the imaginary speed bump by individually controlling front and rear wheel braking forces of the host vehicle.

10. The vehicle driving assist system as recited in claim 9, wherein
    the imaginary speed bump generating section is further configured to generate the imaginary speed bump by initially controlling the front wheel braking forces and, after a prescribed time has passed, controlling the rear wheel braking forces to simulate the actual speed bump.

11. The vehicle driving assist system as recited in claim 10, wherein
    the prescribed time is calculated based on at least the host vehicle traveling speed.

12. The vehicle driving assist system as recited in claim 1, further comprising a visual information imparting section configured to impart visual information to an occupant of the host vehicle when the imaginary speed bump generating section is generating the imaginary speed bump.

13. The vehicle driving assist system as recited in claim 1, further comprising
an audio information imparting section configured to impart audio information to an occupant of the host vehicle when the imaginary speed bump generating section is generating the imaginary speed bump.

14. The vehicle driving assist system as recited in claim 1, further comprising
a temporary stop point detecting section configured to detect a place existing in front of the host vehicle as a temporary stop point requiring the host vehicle to temporarily stop; and
an imaginary ascending road deceleration control section configured to set an imaginary ascending road that continues from the host vehicle to the temporary stop point and to decelerate the host vehicle with a rate of deceleration that the host vehicle would exhibit if the host vehicle were actually traveling on the imaginary ascending road, upon the temporary stop point detecting section the temporary stop point.

15. The vehicle driving assist system as recited in claim 14, further comprising
a slope detecting section configured to detect a slope of a road on which the host vehicle is traveling, and
the imaginary ascending road deceleration control section being further configured to adjust the rate of deceleration in accordance with the slope detected by the slope detecting section.

16. A vehicle equipped with the vehicle driving assist system according to claim 1.

17. The vehicle driving assist system as recited in claim 1, further comprising
an accelerator pedal reaction force control section that increases accelerator pedal reaction force in response to the imaginary speed bump being generated by the imaginary speed bump generating section.

18. A vehicle driving assist system comprising:
a traveling situation detecting section configured to detect a host vehicle traveling speed and a different traveling condition indicative of the host vehicle approaching a designated area; and
an imaginary speed bump generating section configured to selectively generate an imaginary speed bump by artificially reproducing a vehicle behavior in the host vehicle that simulates the host vehicle crossing an actual speed bump arranged on a road surface to alert a driver of the host vehicle that the host vehicle is approaching the designated area and to urge the driver to decelerate the host vehicle, based on the traveling condition being detected by the traveling situation detecting section that the host vehicle is approaching the designated area and the host vehicle traveling speed being detected as higher than a first prescribed speed,
the imaginary speed bump generating section being configured to generate the imaginary speed bump by individually controlling stroke lengths of front and rear wheel suspension devices of the host vehicle,
the imaginary speed bump generating section being further configured to prevent generation of the imaginary speed bump when the host vehicle is traveling at a speed that exceeds a second prescribed speed that is higher than the first prescribed speed.

19. A vehicle driving assist system comprising:
traveling situation detecting means for detecting a host vehicle traveling speed and a different traveling condition indicative of the host vehicle approaching a designated area; and
imaginary speed bump generating means for selectively generating an imaginary speed bump by artificially reproducing a vehicle behavior in the host vehicle that simulates the host vehicle crossing an actual speed bump arranged on a road surface to alert a driver of the host vehicle that the host vehicle is approaching the designated area and to urge the driver to decelerate the host vehicle, based on the traveling condition being detected by the traveling situation detecting means that the host vehicle is approaching the designated area and the host vehicle traveling speed being detected as higher than a first prescribed speed,
the imaginary speed bump generating means selectively generating the imaginary speed bump by supplying brake fluid pressure to each of right, left, front, and rear wheels of the host vehicle within a single generation of the imaginary speed bump to simulate the actual speed bump across an entire wheel width of the host vehicle,
the imaginary speed bump generating means preventing generation of the imaginary speed bump when the host vehicle is traveling at a speed that exceeds a second prescribed speed that is higher than the first prescribed speed.

20. A vehicle driving assistance method comprising:
detecting a host vehicle traveling speed and a different traveling condition indicative of the host vehicle approaching a designated area;
selectively generating an imaginary speed bump by artificially reproducing a vehicle behavior in the host vehicle that simulates the host vehicle crossing an actual speed bump arranged on a road surface to alert a driver of the host vehicle that the host vehicle is approaching the designated area and to urge the driver to decelerate the host vehicle, based on the traveling condition of the host vehicle being detected that the host vehicle is approaching the designated area and the host vehicle traveling speed being detected as higher than a first prescribed speed,
the selectively generating of the imaginary speed bump including supplying brake fluid pressure to each of right, left, front, and rear wheels of the host vehicle within a single generation of the imaginary speed bump to simulate the host vehicle crossing the actual speed bump across an entire wheel width of the host vehicle; and
preventing generation of the imaginary speed bump when the host vehicle is traveling at a speed that exceeds a second prescribed speed that is higher than the first prescribed speed.

* * * * *